United States Patent
Sanchez Herrero et al.

(10) Patent No.: US 7,177,642 B2
(45) Date of Patent: Feb. 13, 2007

(54) METHOD AND SYSTEM FOR HANDLING MULTIPLE REGISTRATION

(75) Inventors: Juan Antonio Sanchez Herrero, Madrid (ES); John Michael Walker, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/480,607

(22) PCT Filed: Jun. 14, 2002

(86) PCT No.: PCT/EP02/06557

§ 371 (c)(1),
(2), (4) Date: Jul. 2, 2004

(87) PCT Pub. No.: WO03/005669

PCT Pub. Date: Jan. 16, 2003

(65) Prior Publication Data

US 2005/0009520 A1    Jan. 13, 2005

(30) Foreign Application Priority Data

Jul. 3, 2001    (EP)    ................................ 01116146

(51) Int. Cl.
*H04Q 7/20*    (2006.01)

(52) U.S. Cl. .................... 455/435.1; 455/433; 709/228
(58) Field of Classification Search ............ 455/422.1, 455/432.3, 433, 435.1, 435.2, 435.3; 370/352, 370/353, 355, 356; 709/228
See application file for complete search history.

(56) References Cited

U.S. PATENT DOCUMENTS

| 5,764,730 | A  | * | 6/1998  | Rabe et al. ................. 455/403 |
| 5,943,620 | A  | * | 8/1999  | Boltz et al. ................. 455/445 |
| 6,311,063 | B1 | * | 10/2001 | Valliani et al. ............. 455/433 |
| 6,778,828 | B1 | * | 8/2004  | Chander et al. ......... 455/435.1 |
| 6,904,035 | B2 | * | 6/2005  | Requena .................... 370/338 |
| 2002/0131395 | A1 | * | 9/2002 | Wang ......................... 370/349 |

* cited by examiner

*Primary Examiner*—William Trost
*Assistant Examiner*—James D. Ewart

(57) ABSTRACT

Method for supporting multiple registration from the same user requested from different terminals in a telecommunications system requiring to manage information related to the location of said user and related to the plurality of identifiers that identify said user in said system. The method allowing further multiple session establishment to any of those terminals. In the home server of said user it is stored a plurality of private identities related to the subscriber data of said user together with, at least, a public identity. Each registration of said user contains a public identity assigned to said user and a private identity among the plurality of said private identities assigned to said user.

28 Claims, 8 Drawing Sheets

METHOD AND SYSTEM FOR HANDLING MULTIPLE REGISTRATION

FIELD OF THE INVENTION

The present invention relates to telecommunications systems requiring to manage information related to the location of their users as well as information related to the identifiers that addresses and identify each of those users in said systems. More precisely, it relates with the support of multiple registrations of, at least, one user of one of said telecommunications system, said multiple registrations requested from a plurality of terminals, and with the further handling of multiple session establishment towards said plurality of terminals

BACKGROUND

Users subscribed to the services provided by a telecommunications system are usually assigned to identifiers (subscriber identifiers, subscriber identities, or subscriber-IDs). For a given subscription of a user in a given telecommunication system, at least one subscriber-ID is used to be assigned. Said subscriber-ID(s) identify uniquely said subscription and is used in said system for addressing and identification purposes. The type, content, and even the number of subscriber-ID(s) per user, depends basically on the characteristics of the telecommunications system.

For instance, in a telecommunications systems such as a Public Switch Telephone Network (PSTN) or Integrated Services Digital Network (ISDN), users are assigned to one telephone number as subscriber-ID (although more than one telephone number can be assigned per user in said systems). These telephone numbers are according to the format specified in ITU-T recommendation E.164 (May 1997), and are assigned per user according to a specific numbering plan. Once an E.164 number is assigned to a user of a PSTN, said number is used both: for addressing (routing) calls to said user, and also to identify said user within the network. Since in this kind of wired systems the point in the telecommunications system where the user access to the service said system provides (the access point) is fixed, the user is supposed to be reachable in the terminal connected to said access point and, therefore, the user is usually not forced to register (attach) prior to get access to the services provided by the telecommunications system.

In other telecommunications system, such as for instance in a 2G (second generation) mobile system (such as a Global System for Mobile communications, or GSM), or in a 3G (third generation) mobile systems (also known as Universal Mobile Telecommunications System, or UMTS), said subscriber-ID is not unique per user. A given user subscribed to one of said 2G or 3G systems is assigned to a unique private identifier (private identity or private-ID) and to, at least, one public identifier (public identity or public-ID).

Also, as opposite to traditional telecommunications systems using fixed (wired) access technologies (e.g.: PSTN), in mobile systems the same user can access to said system from different access points; i.e.: from different locations. Due to this, said user register his/her presence from a different access point in a given moment (e.g.: each time from the same or different terminal through the same or different radio access server); therefore, the user registers (attach) his/her presence in a given access point from a given terminal prior to access to further services, such as make or receive calls. Within said process (hereinafter referred as registration), the user's terminal identifies the subscription he/she holds and wants to activate, and this is accomplished by sending (among other authentication and identification data) the private-ID associated to said subscription.

Once the registration of a 2G or 3G user has run successfully, said user can receive incoming sessions (e.g.: voice calls) on his/her terminal from other users that have "dialled" the public-ID (or one of the public-IDs) associated to said subscription of said user. I.e.: the public-ID is utilized by other users as an aforementioned "telephone number".

At this point, it shall be noticed that the term "session", whenever cited within this invention, encompasses various kind of communications that, according to the state-of-the-art telecommunication systems and telecommunication protocols, can be established between communication peers; thus, being not limited to traditional "voice calls" provided by well known circuit-switched based systems and protocols, but also comprising communications provided by packet-switched (or cell-switched) based systems and protocols, that provides communications with multiple media capabilities, such as audio, video and data, even simultaneously within the same communication. Examples of said communications, known as "multimedia communications" (also as "multimedia sessions" or "multimedia calls"), are described, for instance, in ITU-T recommendation H.323 (November 2000), or in IETF's RFC-2543 "Session Initiation Protocol", SIP (March 1999).

For a given subscription of a given user in a 2G or 3G system, a given home server in the system (known as Home Location Register or HLR, or Home Subscriber Server or HSS.) keeps, among other data, and as a part of the SD (subscriber data) related to said subscription, the relationship between said subscription of said user and the private-ID and public-ID(s) associated to it. Said home servers (for example HLRs or HSSs) are mainly in charge of attending request from other nodes or servers within the system whenever a registration request of a given user needs to be attended (i.e.: granted or rejected), or whenever location information of a given user is needed (e.g.: at call to said user).

In 2G or 3G systems, the private-ID of a given user is unique per user subscription and it is used within the 2G or 3G system for internal identification purposes at registration, authorization, administration, etc.

For a given subscription, said private-ID is also stored in a subscriber identity module known for example as SIM, or USIM for 3G, which is included in the subscriber's card for example a Subscriber Identity Module card or SIM card, or UMTS Integrated Circuit card or UICC, provided to said user, together with other security information related to said subscription such as secret keys used for authentication. Said subscriber's card (SIM card, UICC) is intended to be accommodated, either: fixed or removable, in user's terminals used for accessing said systems.

Unlike Public-IDs, Private-IDs does not need to be known by the users of said systems, nor known by other users of other telecommunications systems, since they are not intended to be supplied (i.e.: "dialled") by a given user for establishing a communication with another user; i.e.: said private-IDs are not intended to be used as "called number", nor intended for identifying the calling or connected party in the end user terminal display.

In 2G systems, a private-ID takes the format of IMSI (International Mobile Subscriber Identity); while in 3G systems, a private-ID takes the form of a NAI (Network Access Identifier) as defined in RFC-2486 "The Network Access Identifier" (January 1999), wherein the IMSI can be contained within the NAI.

In said 2G or 3G systems, the public-ID(s) of a given user is, however, intended for addressing (routing) calls to said user, and, therefore, intended to be used as "telephone numbers" are in other telecommunication systems for example PSTN (Public Switched Telephone Network), ISDN (Integrates Services Digital Network), including calling and connected party identification purposes. So, public-IDs are used for establishing communications between users, and, therefore, intended to be known by the users, not only of said mobile systems (2G or 3G), but also by users of other telecommunications systems which can interwork with said 2G or 3G systems. In this way a user (user-A) who wants to establish a communication with another user (user-B) needs to supply (i.e.: to "dial") the public-ID of said user-B (or one of the public-IDs of said user-B) in the call request said user-A makes. User-B, in turn, can (if said service is allowed) identify the calling party from the public-ID of user-A said user-B receives.

The format of the public-ID(s) of a given user can vary depending on the particularities of the telecommunications system said user is subscribed. In 2G and 3G systems, public-IDs are in the format of E.164 numbers (known as MSISDN numbers) (i.e.: they are typical telephone numbers such as in PSTN). In 3G systems that implements the so called IM Subsystem (or IMS) (Internet Protocol Multimedia Subsystem), said public-IDs can also take another formats, such as SIP-URL (Uniform Resource Locator for Session Initiation Protocol), TEL-URL (Uniform Resource Locator for telephony), etc.

Given that current mobile systems (2G or 3G) do only provide one private-ID per user subscription, and given that said unique private-ID is used in the registration process, said systems does not permit a given user to register into a mobile system referencing the same subscription (i.e.: by identifying the same private-ID on each registration request) from more than one terminal, since it would imply the existence of a SIM cloning situation, meaning the existence of two subscription cards with the same data on them. Therefore (and regardless various complex techniques for SIM cloning detection), if a given user tries to register and already has a registration active for his/her subscription, said new registration is considered a re-registration and all data related to the old registration are overwritten with the data related to the new one.

With this situation, for a given user having only one subscription, only one registration can be active for said user and said single subscription, and no simultaneous locations are allowed for said single subscription. In this way, a given user who wants to have more than one terminal registered, has to hold more than one subscription and use a different subscription for registering each of said terminals.

Modern telecommunication systems (such as 3G mobile systems) are, however, intended to offer a huge variety of services. Depending on the nature of said services, some of them would require some capabilities within the end-user terminal (e.g.: a service based on multimedia capabilities or file/data transfer capabilities) not needed for other services (e.g.: a service based on mere voice capabilities).

This, would make desirable for a given user having one subscription in one of said systems to be registered from a plurality of terminals simultaneously (e.g.: having different capabilities each); and all this, without harming security aspects that rely on the identification of the subscription of said user nor forcing to said user to hold more than one subscription.

FIG. 1 has been taken from the technical specification TS 23.228 (V5.0.0, April 2001) released by the 3GPP (3$^{rd}$ Generation Partnership Project), which is the forum in charge of developing the standards ruling the 3G systems. Although this figure shows the relationship between private-ID and public-ID(s) of a given subscription (Internet Multimedia subscription, or IM-subscription) of a given user (IM-user) of the IMS (Internet Protocol Multimedia Subsystem) of a 3G system; it actually shows the state-of-the-art univocal relationship existing in mobile systems regardless its generation (2G or 3G) between one subscription and the private-ID associated to said subscription. Within said figure, it can be observed that, even though a given user holding a single subscription can be reached (i.e.: called) by means of different public-IDs, the subscription of said user is identified by a single (and only) private-ID.

The relationship shown in FIG. 1 is maintained and held primarily in the home server of said user (HSS, HLR), although copies of said data and relationships can also be kept and used in other nodes (or servers) within the telecommunications system. However the logic inherent to the aforementioned univocal relationship is deployed across any server within the telecommunication system, thus disabling both: to have multiple active registrations of a given user holding a single subscription from a plurality of access points, and to have subsequent calls addressed to said user to be delivered to one or more of said of access points where said user can be located.

Known standards for 3G systems have regarded the possibility of having UMTS subscriber cards holding more than one subscription (i.e.: more than one USIM within the same UICC) (e.g.: 3GPP TS 22.101, v4.0.0, June 2001), thus allowing the same terminal to be registered alternatively for different user subscriptions. However, only one of these subscription can be active in a given moment in said terminal, and, in any case, the capabilities inherent to said terminals related to the kind of sessions it can handle remains the same regardless the active subscription.

SIP (Session Initiation Protocol) was selected by 3GPP as the protocol for handling user registrations and session control for users holding IM-subscriptions. The specification of SIP (RFC-2543) already allows a given user to indicate in a registration message REGISTER multiple contact points where said user can be contacted (i.e.: reached) for further incoming sessions addressed to the identity (i.e.: public-ID) contained in the "From" header or said REGISTER message. These contact points are included in subsequent "Contact" headers within one or subsequent REGISTER messages, wherein each "Contact" header contains an address of a given SIP endpoint (i.e.: a SIP enabled terminal). According to this, a SIP REGISTER message from a given user such as:

REGISTER sip:server2.wcom.com
Via: . . .
From: <sip:UserB@there.com>
To: . . .
Call-ID: . . .
CSeq: 1 REGISTER
Contact: <sip:UserB@110.111.112.113>
Contact: tel:+1-972-555-2222
Content-Length: . . .

if accepted by the registration server "server2.wcom.com", would make that further sessions addressed to said user (i.e.: further INVITE messages indicating in the "To" header the identity "UserB@there.com") are forwarded simultaneously to both contact points that were specified in the REGISTER message: the SIP application in host with IP-Addr (Internet Protocol address)

110.111.112.113 where said user has logged in as "UserB", and to the telephone number "+1-972-555-2222".

However, the adaptation and use of the SIP protocol to the specific architecture of IMS in 3G systems has blocked said possibility, as it can be seen in the 3GPP specification that states the signaling flows for IM-users (TS 24.228, V1.0.0, June 2001). In said specification it is stated that the content of the "Contact" header must be the IP-Addr said terminal is using to access to the 3G system (i.e. the IP-address said terminal got during the process it ran to get a radio bearer packet-based, known as PDP (Packet Data Protocol) Context Establishment process); that is to say, the address it uses to exchange packets with the server which is serving its access to the system.

With this limitation, a given user holding a single IM-subscription in a 3G system, can have only one registration active at the same time, said registration being related to only one access point to the system and to only one terminal attached to said access point and identified by a single address (IP-Addr).

Therefore, according to the state-of-the-art, a given user who would like to have multiple active registrations in any of said mobile systems (2G, 3G) that requires to manage information related to the location of said user for any of those registrations, as well as to manage information related to the identifiers that address and identify said user in said system, would be forced to hold different subscriptions. However, since each individual subscription is held separately in said systems, thus implying separate processing and administration (i.e.: separate accounting records, separate subscription records, separate location data, etc.) it would imply difficulties for the mobile system operator for allowing the same public-ID(s), related to the same user, to be assigned to more than one subscription; no mention to inconvenience for the user, having to deal with multiple bills for the same service.

It should be then desirable a situation wherein, without having to appeal to a solution based on multiple subscriptions per user, a given user having a single subscription in a telecommunications system (such as a mobile system, or other telecommunications system of similar characteristics regarding user identities and location information), is allowed to register into said system from different terminals simultaneously, thus having multiple registrations active simultaneously; and wherein said user can receive calls in any of these registered terminals from other parties that have "dialled" one public-ID that is associated to said single subscription.

SUMMARY OF THE INVENTION

The present invention provides a method for supporting multiple active registration of, at least, one user in a telecommunications system, being said registrations related to a single subscription of said user in said system and being requested each from a plurality of terminals (user equipment, or UE); and for the further handling of multiple session establishment towards any or each of said terminals where said user registered. The invention further relates to a system arranged for implementing said method.

According to one aspect of the present invention, it is provided a method for handling multiple registration of a user in a telecommunications system that manages location information and identification information related to its users; said identification information containing at least, for each user, a unique private identity and one or more public identities. The method comprises the steps of (a) storing, assigned to said user in said telecommunications system, a plurality of private identities related to the subscriber data of said user in said system; (b) receiving subsequent registration requests, each registration request requesting to attach a subsequent terminal to said telecommunications system for said user; wherein each one of said subsequent registration requests contains, at least: a public identity associated to said user among the plurality of public identities associated to said user, and a private identity among the plurality of private identities associated to said user; and (c) processing each of said received subsequent registration requests according to the public identity and private identity received on each of said subsequent registration requests.

Said method allows a given user having one subscription in said system to register on it from a plurality of terminals simultaneously; i.e.: to get granted registrations that can be active simultaneously.

According to a further aspect of the invention, it is provided a method for handling session establishment towards a user having multiple registrations. The method comprises the step of (a) processing said session request according to the plurality of terminals that have a registration granted for said user in said system (i.e.: the plurality of terminals said user is presently registered with); wherein said processing step can consist on: (a1) forwarding said session request to one of these terminals among said plurality of terminals; or (a2) forwarding said session request sequentially to more than one of said plurality of terminals until said session is awarded by one of them; or (a3) forwarding said session request simultaneously to more than one of said plurality of terminals.

Said method allows a given user to receive incoming sessions (voice calls, multimedia calls, multimedia conferences, data transfer, etc.) addressed to a public-ID of said user to be delivered to a plurality of terminals said user is presently registered with; allowing said session to be attended in the terminal with the best (or more appropriate) capabilities for said session; or simply, to be attended in the end-user terminal which is physically closest to said user.

According to a further aspect of the invention, it is provided a telecommunications system for handling multiple registrations of a single subscription in said system. Said system comprises: (a) storage means arranged to store per user, at least, one or more public identities and a plurality of private identities; and (b) processing means arranged to process subsequent registration requests of a given user according to the public identity and according to the private identity (among said plurality of private identities) received on each of said registration requests.

Said system allows multiple active registrations related to a single subscription.

According to a further aspect of the invention, the aforementioned system for handling multiple registrations is further augmented for handling session establishment towards any or all the active registrations related to a single subscription. The system according to this aspect comprises (a) processing means arranged to process a received session request, said session request containing a public identity associated to said user, according to the plurality of terminals that have a registration granted for said user in said system; wherein said processing means can be further arranged to: (a1) forwarding said session request to one terminal among said plurality of terminals; or (a2) forwarding said session request sequentially to more than one of said plurality of terminals until said session is awarded by one of them; or (a3) forwarding said session request simultaneously to more than one of said plurality of terminals.

Said system allows to deliver an incoming session to any of the terminals that have a granted registration for the subscription addressed by the public identity indicated in said incoming session.

According to a preferred embodiment of this invention, the telecommunications system comprises one or a set of functional server entities in charge of various functions, such as:
- storing the subscriber data of the users of said system (referred also as home server entity, or HSS, HLR),
- serving the access to said system to the terminals (UEs) used by its users (referred also as first-contact-point server entity, or Proxy Call State Control Function, P-CSCF),
- serving the initial handling of transactions involving users of said system (referred also as interrogating server entity, or Interrogating Call State Control Function, I-CSCF), and
- serving session control services for sessions involving users of said system (referred also as session-control server entity, or Proxy Call State Control Function, Serving Call State Control Function, S-CSCF).

If said functions are performed by a single server entity, or by a set of distributed or co-located functional server entities, does not affect the scope of the present invention.

BRIEF DESCRIPTION OF DRAWINGS

The features, objects and advantages of the invention will become apparent by reading this description in conjunction with the accompanying drawings, in which.

DETAILED DESCRIPTION OF PREFERRED EMBODIMENTS

Figure 1:
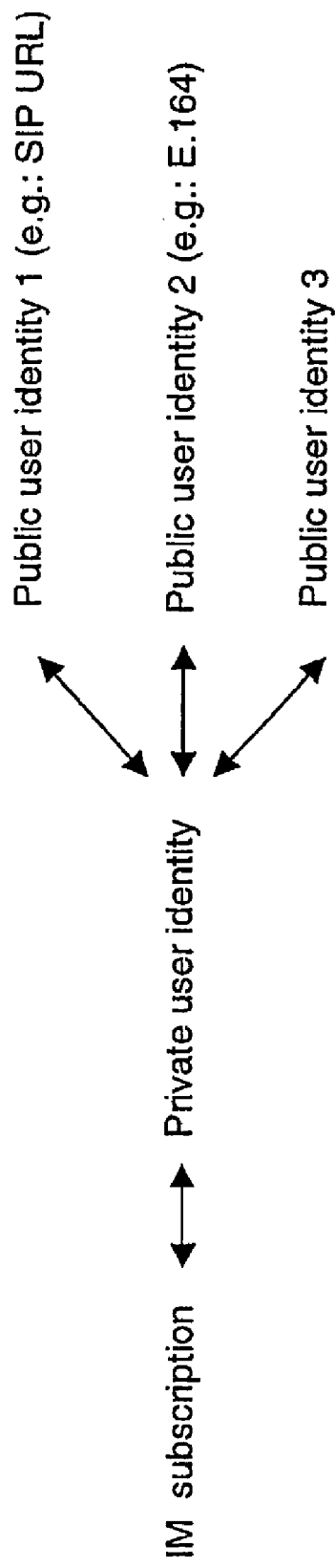
FIG. 1 shows the prior-art 1:N relationship between private and public identities, and 1:1 relationship between one IM-user subscription and its corresponding private identity as defined by aforementioned 3GPP standard TS 23.228.

The invention shall now be described in detail with reference to FIGS. 1 to 8 according to a preferred embodiment. Said preferred embodiment considers, as an example of a telecommunications system where the methods of this invention can apply, a 3G mobile system that implements the so called (IMS) (Internet Protocol Multimedia Subsystem), in which (as standardized by 3GPP) the well known protocol SIP (Session Initiation Protocol) is the protocol used for handling user registrations and session control for users holding IM-subscriptions.

It shall be understood that the scope of the present invention is not limited to said 3G systems nor to a specific signaling protocol; and, a skilled person can readily apply it to any telecommunications system having to manage data (hereinafter: subscriber data, or SD) related to, at least, one user holding a subscription in said system; said SD (subscriber data) comprising, at least, information related to the identifiers used in said system to identify and locate said user (private-ID, public-ID), and having to manage information related to the location of said user.

Said telecommunications system can, for instance (but not limited nor forced to), comprise one or a set of functional server entities in charge of various specialized functions, such as: storing the subscriber data of the users of said system, serving the access to said system to the terminals (UEs) used by its users, serving the initial handling of transactions involving users of said system, and serving session control services for sessions involving users of said system. Wherein, if said functions are performed by a single server entity, or by a set of distributed or co-located functional server entities, does not affect the scope of the present invention. In particular, aspects concerning if said functional server entities are implemented in separate physical entities (i.e.: machines, nodes, servers) or are just implemented as functional entities either: co-located or distributed among different physical entities, as well as aspects concerning details of the interconnection network (or networks) that links said servers entities (in case they are implemented in separate physical entities) and aspects concerning details of the access technology used by the user terminals UE(s) to access to said system, neither affect the scope of the present invention.

The telecommunications system, according to the preferred embodiment described hereinafter, is arranged to manage subscriber data (SD) related to, at least, one user holding a subscription in said system. Said subscriber data (SD) comprises, at least, information related to the identifiers used in said system to identify and locate said user (private-ID, public-ID), and information related to the location of said user (LOCATION DATA). The telecommunication system also comprises the following functional server entities:
- a home server entity (HSS/HLR), in charge of storing the subscriber data of the users of said system;
- a first-contact-point server entity (referred within this invention as Proxy-Call State Control Function or P-CSCF), in charge of serving the access to said system to the terminals (UEs) used by its users;
- an interrogating server entity (referred within this invention as Interrogating-Call State Control Function or I-CSCF), in charge of the initial handling of transactions involving users of said system; and
- a session-control server entity (referred within this invention as Serving-Call State Control Function or S-CSCF), in charge of session control services for sessions involving users of said system.

The 3GPP specification TS 23.002 (V5.2.0, April 2001) defines the general network architecture of a 3G system, comprising the basic entities, as well as the specific entities belonging to the IMS defined above (P-CSCF, I-CSCF, S-CSCF, HSS/HLR); while general and detailed signaling flows are described respectively in aforementioned specifications TS 23.228 and TS 24.228. The detailed content of the messages (queries, responses, notifications, etc.)

exchanged through the so called "CX reference point" between any of the so called Call State Control Functions (or CSCFs) and the HSS are further detailed in 3GPP specification TS 29.228 (V0.1.0, June 2001). According to the information disclosed in 3GPP specifications for IMS (on its present versions), SIP protocol is used for handling user registrations and session control for users holding IM-subscriptions, and DIAMETER protocol (IETF draft) is used at the "CX reference point".

At this point, it shall be noticed that, according to 3GPP specifications for IMS, the various Call State Control Function (or CSCF) independently of their function (if P-CSCF, I-CSCF or S-CSCF) are referenced with their individual names (as it can be seen, for instance, in the signaling flows detailed in the aforementioned 3GPP specification). Since said individual names (e.g.: a SIP-URL) have to be resolved (by using, for instance, Domain Name System, DNS, or similar technique) into the corresponding individual addresses (e.g.: an Internet Protocol address), they usually shall contain a domain portion identifying the network realm of the 3G system operator they belong to. For instance, a name such as "X-CSCF1.ZZZ.NET", wherein the "X" stands for any function among: proxy (P), interrogating (I) or serving (S), stands for a X-CSCF named "X-CSCF1" within the domain "ZZZ.NET" (i.e.: thus distinguished from other CSCFs with equal name but belonging to different domains). In accordance with this, wherever in this invention it is cited a given CSCF name (such as for instance "P-CSCF2", "S-CSCF1", etc.), it shall be understood that said names may contain also a domain portion within its name, even though in some examples within this invention are not shown; being the relevant aspect that said names uniquely identify a given CSCF within a given network realm.

Figure 2:
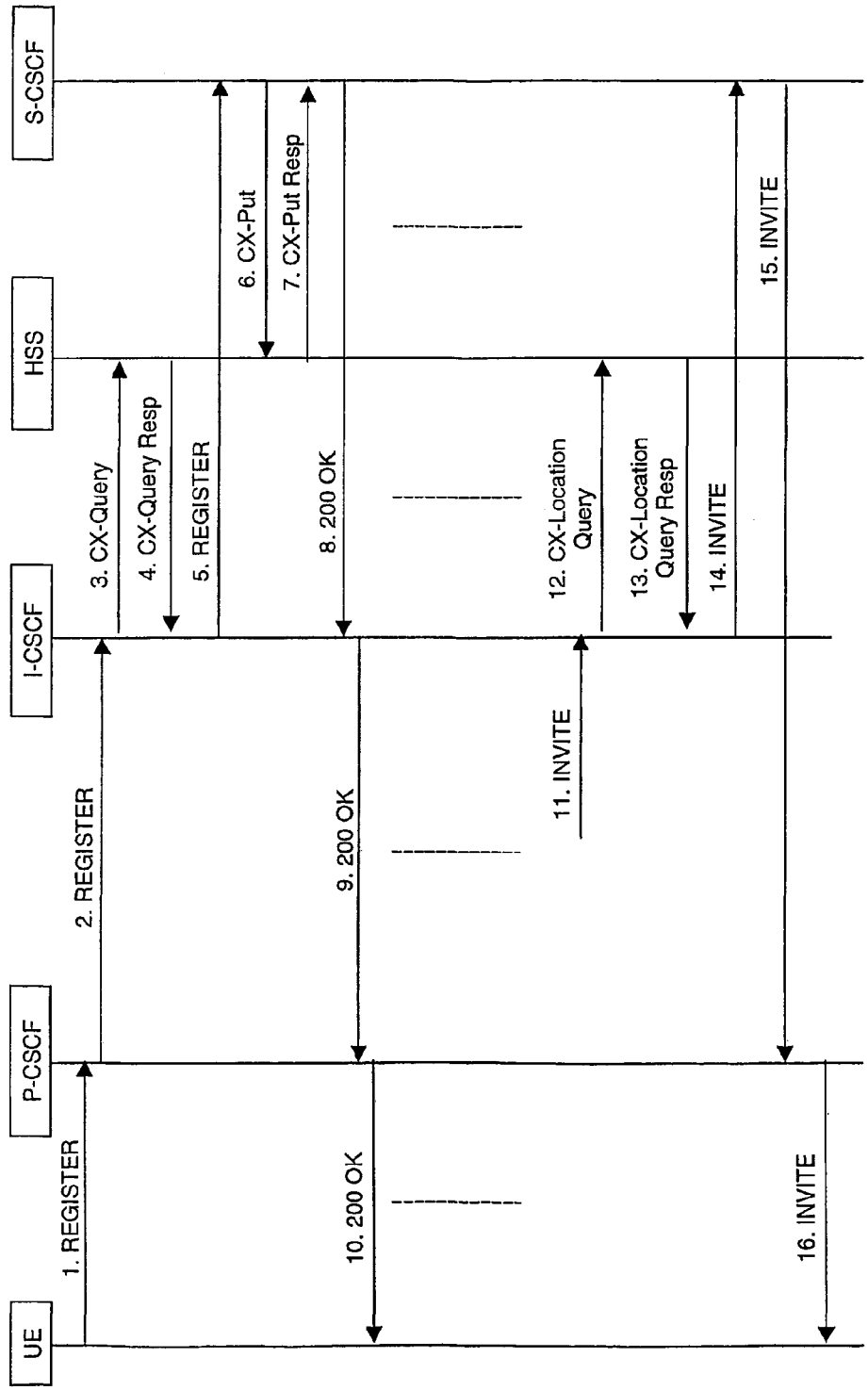
FIG. 2 shows a registration flow and a further session establishment flow of an incoming session, as currently defined by 3GPP standards.
Figure 3:
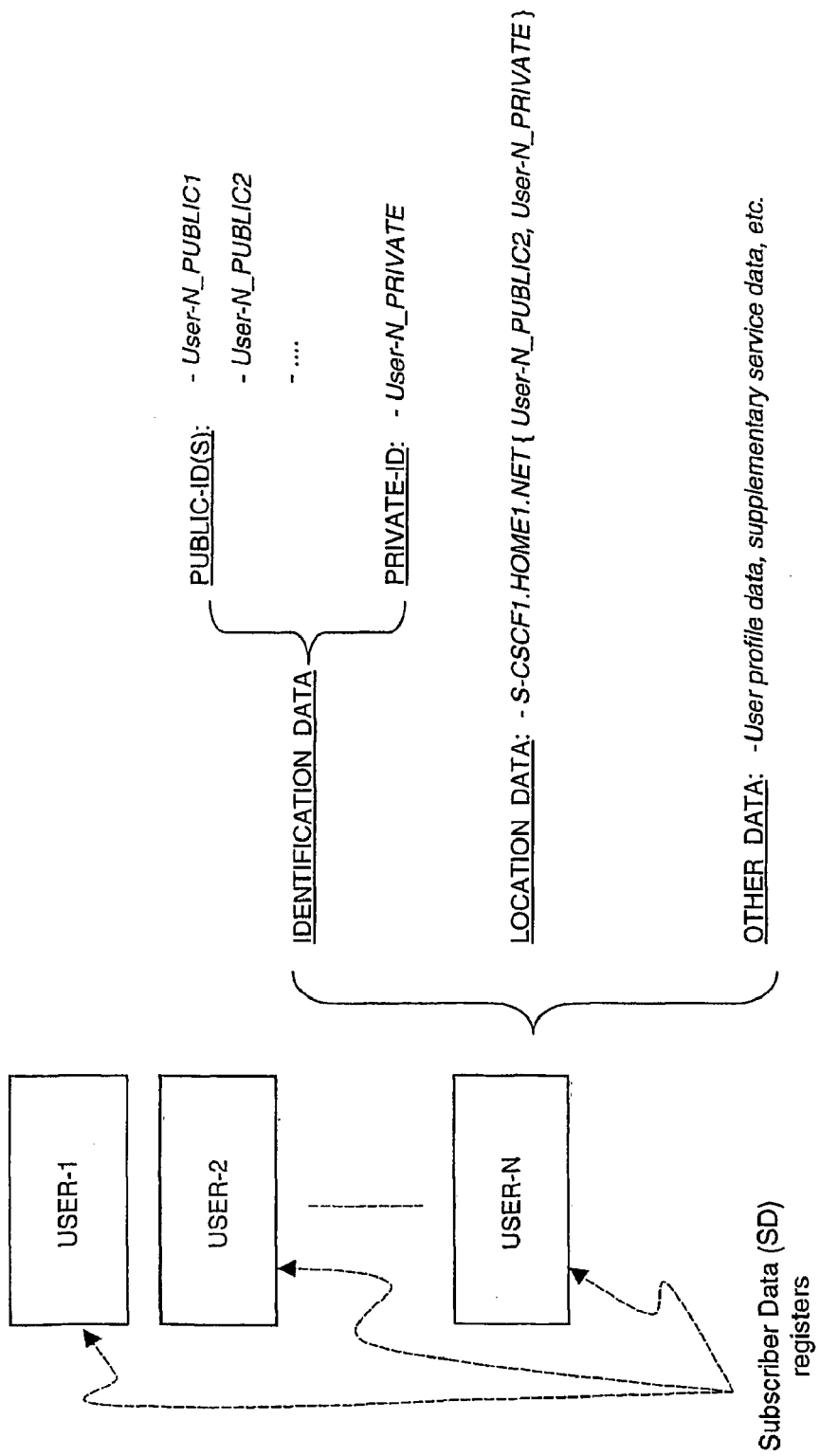
FIG. 3 shows a prior-art simplified view of the subscriber data registers in a home server storing each the subscriber data a given user, wherein the content of one of these register is further detailed.

For a better understanding of the novel methods and system arrangements described within this invention, reference shall now be made to FIGS. 1 to 3 in order to illustrate the state-of-the-art handling of a registration procedure in a 3G system of a given user (IM-user) that holds a single subscription (IM-subscription) in said system, as well as the handling of further incoming sessions addressed to said user.

In particular, FIG. 2, steps 1 to 10, shows a simplified signaling flow of a registration process requested by a given IM-user from a given terminal, UE, in a 3G system as a result of the processing of a registration request REGISTER, by the processing means on the entities depicted in said figure: P-CSCF, I-CSCF, HSS, S-CSCF. Details regarding the complete flow, can be found in 3GPP aforementioned specifications TS 23.228 and 24.228; wherein aspects that does not affect the scope of this invention, such as the process that the registering UE runs to get a radio bearer packet-based (PDP context establishment), P-CSCF discovery, details concerning if the user is registering from a 3G system (visited system) which is not the 3G system where said user has the subscription (home system), etc., are further detailed. With regard to this, and for the sake of a greater simplicity, it shall be noticed that, in FIG. 2, authentication sub-flows (that could run at this phase) have been also omitted. Said authentication sub-flows could be based, for instance, in a challenge/response mechanism (or any other known authentication mechanism); and could consist on an "authentication challenge" and the subsequent "response" to said challenge exchanged between the serving entities in the 3G and the registering terminal. In any case, the applicability or not of said authentication sub-flows does not affect the understanding of the prior-art flow shown in said figure with respect to the modifications introduced by the present invention that shall be further explained.

In step 1 of FIG. 2 said user sends a registration request REGISTER, from terminal UE to the first-contact-point server entity P-CSCF that is serving the access of said UE to said system. The procedure allowing both: UE and P-CSCF to learn each other address (IP-Addr) belongs also to the known art.

The REGISTER that the UE sends contains, among other data, some identification data that (as it is outlined in the relationships shown in FIG. 1) will be used by the system to identify and authenticate to the individual subscription said identification data belong to, and, thus, to identify and authenticate the user that owns said subscription. In particular said registration request REGISTER must contain (among other data) the private-ID associated to said subscription, and one public-ID among the plurality of public-IDs that are associated to said subscription; since said information is needed to identify the subscription of said user, and thus, to match in the home server entity HSS the corresponding SD register belonging to said single subscription of said user, among the plurality of SD registers belonging to other subscriptions that are stored in said HSS (as shown in FIG. 3). It has to be noticed that the inclusion of said private-ID (and even the inclusion of said public-ID) in the REGISTER can be, according to some state-of-the-art UEs, an automatic process performed by the application running in the UE, wherein said data are extracted from the USIM contained in said UE.

When the registration request REGISTER arrives to the first contact point server entity P-CSCF, said P-CSCF binds then the address of the registering UE with the public-ID received in the REGISTER and, in step 2 of FIG. 2, it then forwards the REGISTER to an interrogating server entity I-CSCF, wherein the P-CSCF has added information related to itself as being the first contact point server entity P-CSCF serving the access of said UE. Prior to said forwarding, the P-CSCF performs a query to the DNS (Domain Name System) in order to determine the right interrogating server entity I-CSCF where to forward said REGISTER.

Once said registration request REGISTER arrives to the I-CSCF, in step 3 a query is made to the HSS to determine the user registration status CX-Query. Said query comprises both data: the public-ID and private-ID received in the REGISTER, and will be used by the HSS to find out the corresponding SD register of said user. It shall be noticed here that implementations details regarding said SD register (e.g.: if there is a single register or there are a set of related/linked registers per user subscription, or even if said registers reside in the HSS or in another data base) are not relevant for the understanding of the prior-art nor for the scope of the present invention; being the relevant matter for this aspect that the subscriber data (SD) of a given subscription related to a given user are distinguished among other SDs pertaining to other subscriptions of other users. With regard to this, FIG. 3 shows a simplified schematic view of the storage means containing SD of a plurality of users. In particular FIG. 3 shows more detailed the content of a given SD register pertaining to the subscription of a given user (depicted as USER-N in the figure) on a 3G system, wherein the data stored in said register has been logically grouped into different classes of data according to its nature and functionality; however, these data can exist ordered and/or grouped in other ways. In FIG. 3, data stored under "IDENTIFICATION DATA" comprise static information related to user identities; among other data, said identification data comprises the public-ID (or the plurality of public-IDs)

associated to a single subscription of a given user (depicted as "User-N_PUBLIC1", "User-N_PUBLIC2", . . . , in the figure), as well as the single (unique) private-ID associated to said single subscription (depicted as "User-N_PRIVATE" in the figure). In FIG. 3, data under "LOCATION DATA" stores information related to the server which is serving an active registration of said user (if any); being its nature fully dynamic, as opposed to the static nature of the information under identification data. Belonging to the same SD there can be other stored data (e.g.: data related to the profile or profiles of said user for said subscription, supplementary services activation status, supplementary services additional data, etc.) that are not shown in detail within FIG. 3, since they are beyond the scope of the present invention.

The HSS, upon the query received in step 3 of FIG. 2, and once the corresponding SD register has been found, performs a check in the location data of said SD register to verify if there is already an active registration for the received private-ID "User-N_PRIVATE". According to the state-of-the-art, if at this step it is detected in the HSS that there is an active registration (i.e.: location data is not empty), it is considered a re-registration, and then, the HSS answer back in step 4 with a registration status query response CX-Query Resp comprising information related to the session-control server S-CSCF in charge of serving session control services for said user (e.g.: "S-CSCF1.HOME1.NET"), together with a registration status indication that states that said user is already registered. Otherwise (i.e.: location data is empty), the registration status query response (CX-Query Resp) sent in step 4 comprises a registration status indication indicating that said user is not registered, together (optionally) with the capabilities for selecting a given S-CSCF to be assigned to serve session control services for said user.

If the user is already registered (e.g.: re-registration) then the I-CSCF forwards in step 5 the REGISTER to the S-CSCF that was indicated by the HSS. Otherwise, it the user is not registered, then it selects an S-CSCF, and in step 5 forwards said REGISTER to said S-CSCF.

When S-CSCF receives the REGISTER, it stores the information included on it. In particular it stores the received private-ID and public-ID of the user who is registering, and information related to the P-CSCF that is serving the access of the UE from which said registration has been requested. Then the S-CSCF in step 6 notifies to the HSS that said user has been registered in said S-CSCF (CX-Put); said notification comprising the private-ID and public-ID received in the REGISTER, as well as information related to said S-CSCF, and a "server assignment type" field stating "registration".

Upon reception of said notification, the HSS finds the corresponding SD register for said user (e.g.: perform a search based on the private and/or public ID), and stores in the location data of said SD register information stating that said S-CSCF is serving session control services for said user (e.g.: "S-CSCF1.HOME1.NET"). It shall be noticed now that, as shown in the state-of-the art depicted in FIG. 3, only one registration can be active in a given moment for a given user subscription; therefore, in a given moment only one entry can exist within the location data of a given SD register (e.g.: an entry such as the entry: "S-CSCF1.HOME1.NET {User-N_PUBLIC2, User-N_PRIVATE}", shown in FIG. 3 for USER-N). This causes that any entry previously stored in said location data to be overwritten at reception of a register notification (CX-Put) in the HSS.

Next, in step 7, the HSS gives back to the S-CSCF the result of the registration in said HSS (accepted or rejected) together with data related to the user profile of the registering user (CX-Put Resp). If the result of the registration has been successful, a registration response (200 OK) is sent back in steps 8, 9 and 10 to the UE from which said registration was requested.

Once a given user has successfully registered into the 3G system, further incoming sessions (i.e.: voice calls, multimedia calls, etc.) that are addressed to the public-ID said user indicated in the registration request (REGISTER) shall be delivered to the UE that got the granted registration. Said delivery shall be made via the S-CSCF that was assigned in said registration, and via the P-CSCF that is serving the access to said UE in said 3G system and that served said registration.

The state-of-the-art handling of a session establishment towards a given registered user, as a result of the processing of a session request (INVITE) by the processing means on the entities depicted in said figure (P-CSCF, I-CSCF, HSS, S-CSCF), shall now be described with reference to FIG. 2, steps 11 to 16. Also FIG. 3 will be used to illustrate a more concrete case in which a given user (USER-N), that has successfully registered using his/her private-ID (User-N_PRIVATE) and one of his/her public-IDs (User-N_PUBLIC2), receives an incoming session.

In step 11 a session request (INVITE), addressed to said USER-N, arrives to an I-CSCF. From where said INVITE is received in said I-CSCF depends on the location of the session originator. For instance, if someone in the PSTN made a call dialling "User-N_PUBLIC2" (assuming said "User-N_PUBLIC2" is in the format of an E.164 number), then the INVITE arrives to the I-CSCF from a Media Gateway Control Function (MGCF) which, among other duties, is in charge or translating signaling protocols used in other telecommunications systems (such as Signaling System Number 7) to the signaling protocol used in 3G system for multimedia sessions where IM-users are involved. The session originator could, for instance, be within a 3G system; in that case, another user has sent from his/her terminal an INVITE indicating in the "To" header the identity "User-N_PUBLIC2"; in that case, said INVITE can arrive to said I-CSCF from the S-CSCF which is assigned to said session originator.

In any case, the location of the session originator, as well as signaling flows or details previous to the arrival of said INVITE to the I-CSCF, are not relevant for the understanding of the prior-art shown in FIG. 2 nor for the modifications introduced by the present invention in said prior-art that shall be further explained.

Then, in step 12, the I-CSCF sends a location query (CX-Location Query) to the HSS to find out the S-CSCF that is assigned to serve session control services for the called user, wherein said query comprises the public-ID received in the INVITE (e.g.: User-N_PUBLIC2) to identify said called user in the HSS. The HSS then locates the corresponding SD register of said called user (USER-N) that matches said public-ID and finds there is a S-CSCF assigned to said user (e.g.: "S-CSCF1.HOME1.NET"), and in step 13 the HSS sends back a location query response (CX-Location Query Resp) comprising information related to said S-CSCF.

Upon reception of the location query response, the I-CSCF in step 14 forwards the INVITE to the S-CSCF indicated by the HSS. Then said S-CSCF looks in the stored information related to P-CSCFs it has, the particular P-CSCF through which a registration was requested (REGISTER) and granted (200 OK) that contained the public-ID referenced in the INVITE, and forwards in step 15 the INVITE to it. Upon reception of the INVITE in the P-CSCF, a similar procedure is performed to find out in said P-CSCF the address (IP-Addr) of the terminal (UE) that got granted a registration indicating said public-ID, and in step 16 forwards the received INVITE to said UE.

A given user registered into a 3G system can become de-registered from said system either: upon user request, made from the registered terminal (user-initiated de-registration); or upon 3G system decision (network-initiated de-registration). Either: user-initiated or network-initiated de-registration, the state-of-the-art de-registration procedures causes a deletion of the location data stored in the SD register associated to said user; i.e.: "LOCATION DATA" of USER-N shown in FIG. 3 becomes empty, since, as mentioned before, only one entry in said location data exist. Also, user-initiated or network-initiated de-registration causes the deletion of previously bound data in the S-CSCF and in P-CSCF which were serving said registration. So, in the S-CSCF it is deleted the previously stored information that bound the public and private IDs used in the registration with the P-CSCF serving the access to said registration. Similarly, in the P-CSCF it is deleted the previously stored information that bound public and private IDs used in the registration with the address of the UE that requested said registration. A user-initiated de-registration procedure (not shown in FIG. 2) runs in a similar manner as the registration procedure does: a REGISTER is received from an already registered UE indicating an expiration value ("Expires" header) of zero (0). A similar flow as the one depicted in FIG. 2, steps 1 to 4 is executed that determines the S-CSCF which is currently serving the active registration of said user. Said S-CSCF then sends a notification to the HSS indicating that said user has been de-registered from said S-CSCF (CX-Put), wherein said notification this time comprises a "server assignment type" field stating "de-registration", together with the aforementioned identification data related to the de-registering user and to the S-CSCF.

Figure 4:
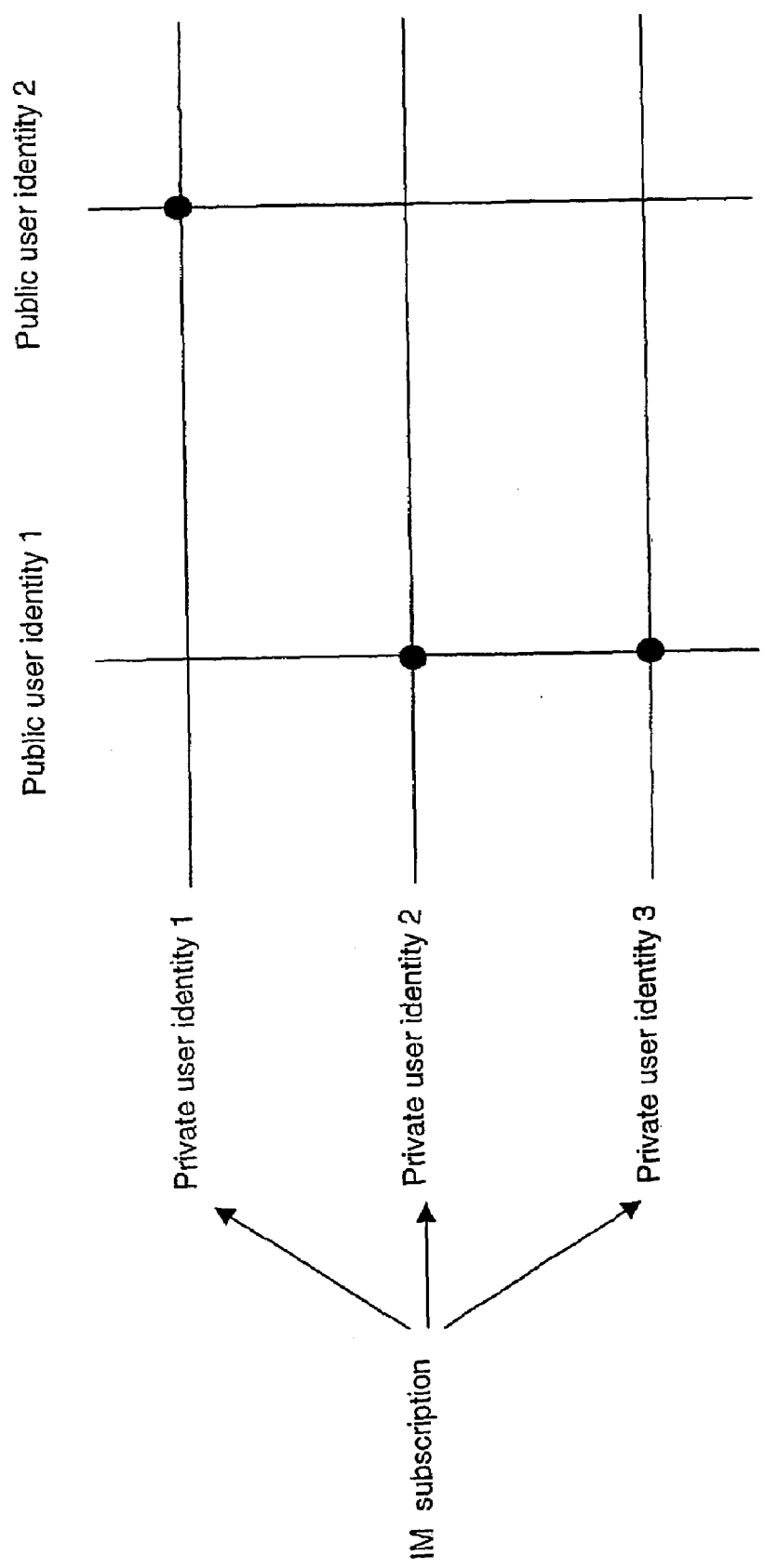
FIG. 4 shows an N:N relationship between public and private identities and an 1:M relationship between one IM-user subscription and the private identities for said user subscription according to the present invention.
Figure 5:
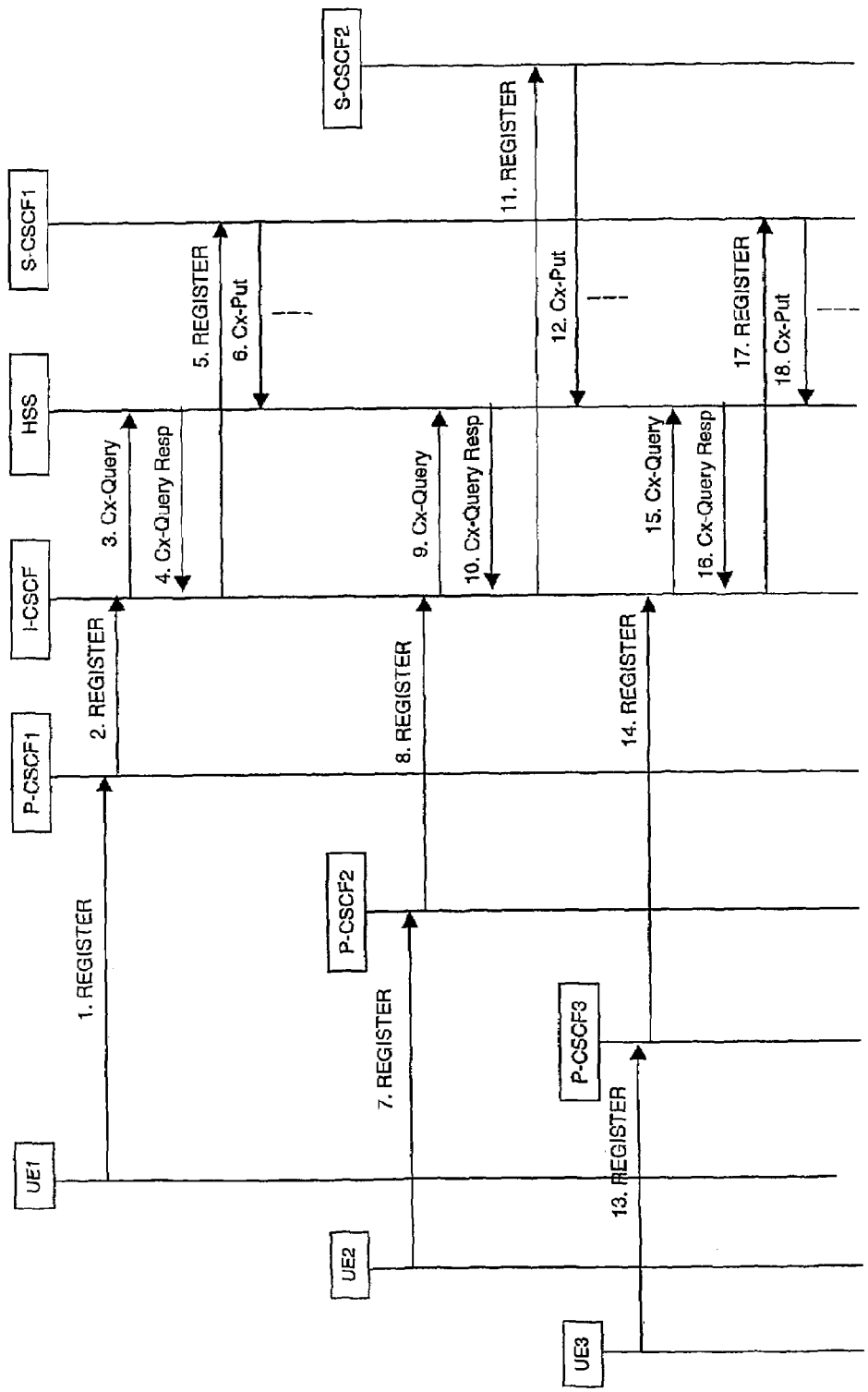
FIG. 5 shows a multiple registration flow according to the present invention.
Figure 6:
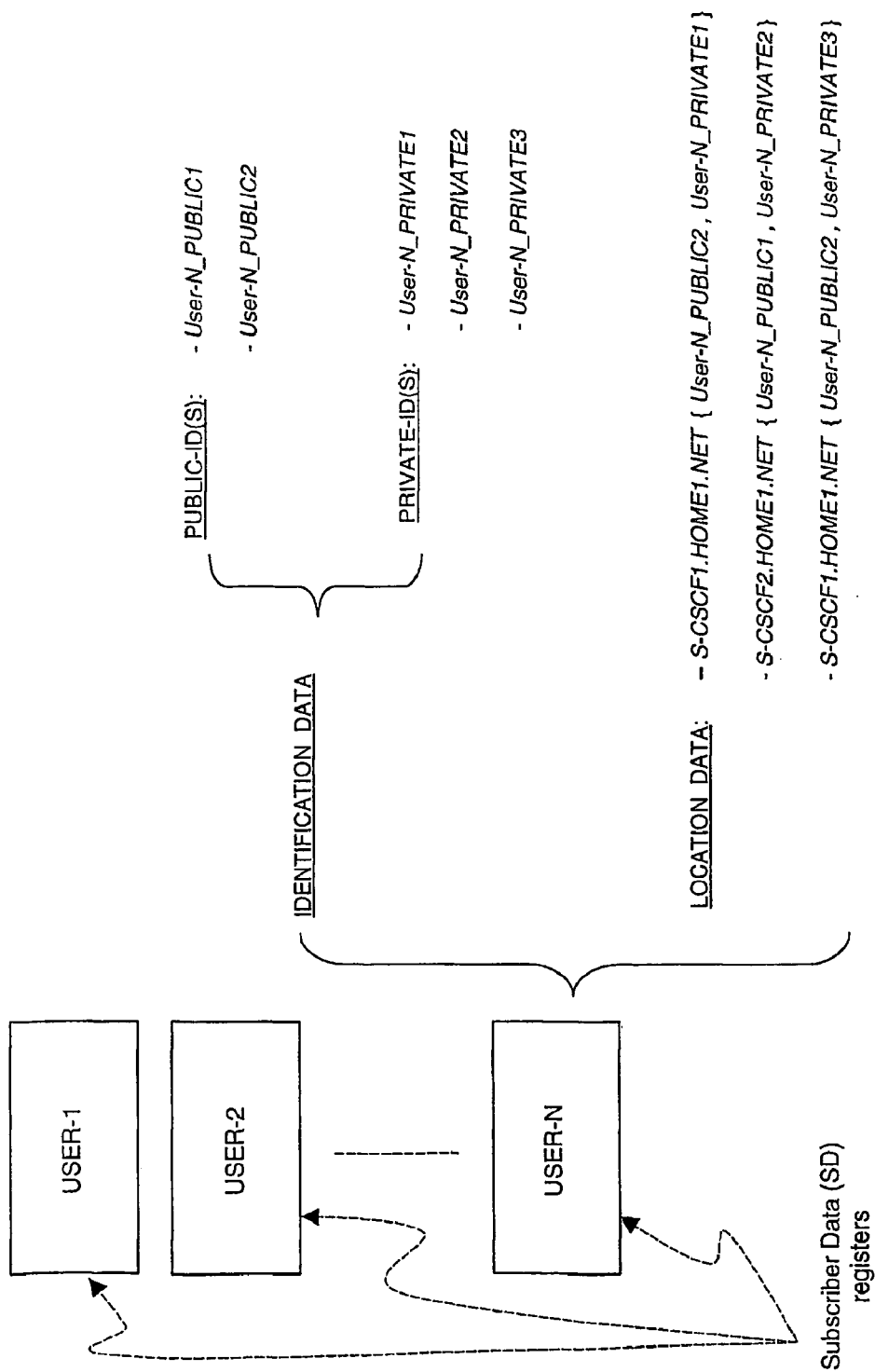
FIG. 6 shows the same view as in FIG. 3 according to the present invention.

Reference is now made to FIGS. 4 to 6 to illustrate a novel method and system arrangements according to the present invention for handling multiple registrations in a 3G system of a given user (IM-user) that holds a single subscription (IM-subscription) in said system.

For said single subscription of said user, a plurality of private-IDs are defined and stored in the storage means of the HSS that is assigned to store the subscriber data (SD) of said user for said subscription; thus allowing, as shown schematically in FIG. 4, said subscription to be referenced (i.e.: registered, called) by means of any of the plurality of identifiers associated to it. Within said FIG. 4, that should be compared with FIG. 1 that shows the correspondent prior art for the same abstraction, multiple registrations of the same given subscription of said user can be held, given that each registration references a different private-ID among the plurality of private-ILs that are associated to it ("Private user identity 1", "Private user identity 2", "Private user identity 3"). Correspondingly, and as will be further detailed, further sessions addressed to the public-ID of this user, or (as an implementation option) to any of the public-IDs of this user ("Public user identity 1", "Public user identity 2") shall be held taking into consideration said multiple registrations. For instance, and as indicated by the dots shown within FIG. 4, a session addressed to "Public user identity 1", can be handled according to registration status of "Private user identity 1" and "Private user identity 2", while session addressed to "Public user identity 2" can be handled according to registration status of "Private user identity 3"; although (as an implementation option) any of those sessions can also be handled according to the registration status of any or all of the private-IDs associated to said subscription.

The multiple registration process in a 3G system of a given user that holds a single subscription in said system shall now be described with reference to the simplified signaling flow shown in FIG. 5. References shall also be made to FIG. 6 to exemplify a specific case of a given user (USER-N). In particular, FIG. 5, shows a simplified signaling flow of a registration process requested by a given IM-user from a plurality of terminals (UE1, UE2, UE3) in a 3G system as a result of the processing of subsequent registration requests (REGISTER) by the processing means on the entities depicted in said figure (P-CSCFs, I-CSCF, HSS, S-CSCFs).

As previously done for equivalent state-of-the-art FIG. 2, and also for the sake of a greater clearness that helps to highlight the novel aspects described hereinafter, FIG. 5 does not show any authentication sub-flow. However, those skilled in the art who are familiar, for instance, with the detailed registration flows described in 3GPP specification TS 24.228, will easily understand how the methods described within this invention can equally apply if said authentication procedures take place. For example, for each registration, said authentication sub-flows can consist on additional messages exchanged between the serving entities shown in FIG. 5 and the registering terminal(s) (e.g.: a challenge/response mechanism) that could convey private or public identities used in the registration. In that case, a "challenge response", sent from a registering terminal as a result of a received "authentication challenge", could be embedded within a new registration request REGISTER that, as explained previously, would have to convey a private identity and (at least) a public identity to identify the particular subscription said identities belong to; although other method could be used. In any case, given that an authentication procedure (if used) would always be associated to a registration request, being identities related to a given subscription always referenced in said registration request; if said authentication procedure takes place or not, does not affect the basic processing of a registration request based on private and public identities referenced on it, which is one of the objects of the present invention.

Within FIG. 6 (that will be further referenced in relation to detailed descriptions of further aspects of this invention) it is shown a simplified schematic view of the storage means containing SD of a plurality of users. In particular FIG. 6 shows more detailed the content of the SD register of given user (USER-N), wherein, according to the present invention, a plurality of private-IDs have been assigned (User-N_PRIVATE1, User-N_PRIVATE2, User-N_PRIVATE3) for said user in relation to the identification data of his/her subscription. It shall be noticed that, although three private-IDs are shown in this example, a higher or lower number of private-IDs assigned per subscription is an aspect that does not affect the scope of the present invention. The identification data of said subscription also comprises plurality of public-IDs (User-N_PUBLIC1, User-N_PUBLIC2); although, for the fundamental scope and understanding of the present invention, it is not relevant if there are more than one public-IDs associated to a given user.

FIG. 6 (as opposed to FIG. 3) also shows that, according to the present invention, the location data of a given SD register can comprise a plurality of entries; more precisely, it can comprise information related to a plurality of S-CSCFs and a plurality of identities (private-IDs, public-IDs); wherein, as will be further explained, each S-CSCF stored in the location data of said SD register has been assigned to serve session control in subsequent registrations of the same user (the user said SD register belongs to), said subsequent registrations indicating each a different private-ID assigned to the subscriber data of said user, among the plurality of private-IDs assigned to the subscriber data of said user.

As shown in FIG. 5, steps 1, 7 and 13, said user (USER-N) sends subsequent registrations requests (REGISTER) from subsequent terminals (UE1, UE2, UE3) via different P-CSCFs (P-CSCF1, P-CSCF2, P-CSCF3), indicating on each of said registrations, at least, one public-ID and one private-ID, among the plurality of public-IDs and private-IDs associated to said user. The specific case shown within this figure, in which three registration flows are displayed as an example, shall not be considered as limiting the scope of the present invention, since, as it shall be further understood, the methods disclosed hereinafter applies whenever more than one registration request is received for the same user.

It has to be noticed that, for every successful registration request shown in FIG. 5, there is a registration confirmation flow (not shown) similar to the one shown in FIG. 2 steps 7 to 10, each of said confirmation flow going back to the terminal that gets the granted registration (UE1, or UE2, or UE3) through the CSCFs intervening in said granted registration. Aspects such as: if the same P-CSCF is serving the access to more than one of these UEs, or even to all of them, or if there is a different P-CSCF serving the access to each one of these UEs; are regarded by the present invention, as it shall be understood hereinafter.

For a better understanding of the process, it can be assumed that, prior to the signaling flow of FIG. 5, said user has not any active registration yet; i.e.: it is not registered yet with any of the private-IDs associated to said user, and thus, the location data in the SD register corresponding to said user is still empty (e.g.: location data of USER-N shown in FIG. 6 does not contain any data yet).

Steps 1 to 3 of FIG. 5 are similar to equivalent steps 1 to 3 of the registration request explained previously with reference to FIG. 2. In the specific case shown in FIG. 3, a terminal (UE1) sends a registration request (REGISTER) through a given P-CSCF (P-CSCF1). As mentioned above with reference to the prior-art flow in FIG. 2, the P-CSCF receiving a REGISTER binds the address of the terminal with the public-ID indicated in the received REGISTER.

The HSS, upon reception of the registration query made by the I-CSCF in step 3 (CX-Query), locates then the SD register of the user referenced by the private-ID and public-ID received in said query. Considering the specific case mentioned above to illustrate the flow, and assuming that the private-ID received is "User-N_PRIVATE1" and the public-ID received is "User-N_PUBLIC2", then the SD register of USER-N shall then be encountered by the HSS among the plurality of SD registers belonging to subscriptions of other users. To find out said SD register the HSS does not need to use any novel technique; any state-of-the-art search technique based on the received private-ID and/or the received public-ID can be used for said purpose.

Once said SD register have been found, it is checked in the location data of said SD if said user is already registered with the received private-ID (User-N_PRIVATE1); that is to say, if there is already a S-CSCF assigned to serve session control services for the received private-ID User-N_PRIVATE1 (i.e.: any entry in the location data that contains said received private-ID). Considering the assumption made above, at this stage, the location data in said register is still empty; therefore, in step 4 a registration query response (CX-Query Resp) is sent to the I-CSCF comprising: a registration status indication, stating that USER-N is not registered with said received private-ID, and (optionally) the capabilities required for selecting from said I-CSCF an S-CSCF that will finally support for said registration session control for further sessions involving said user for said received private-ID (User-N_PRIVATE1) and public-ID (User-N_PUBLIC2).

Since the registration status indication states that the registering user is not registered with said received private-ID, and no S-CSCF is indicated by the HSS on the registration query response, the I-CSCF, using state-of-the-art techniques for selecting an S-CSCF when no S-CSCF is provided by the HSS (e.g.: based on the capabilities received from the HSS), selects an S-CSCF and forwards the INVITE to said selected S-CSCF in step 5. In the example shown in FIG. 5 said selected S-SCCF is "S-CSCF1".

Then, the selected S-CSCF (S-CSCF1) stores information related to the P-CSCF serving said registration (P-CSCF1) as well as the private and public IDs indicated on it (User-N_PRIVATE1, User-N_PUBLIC2) and, in step 6, notifies (CX-Put) to the HSS that said S-CSCF1 will serve sessions involving said private-ID (User-N_PRIVATE1) and said public-ID (User-N_PUBLIC2). Said notification (CX-Put), as well as the other "CX-put" notifications shown in the flow depicted in FIG. 5 comprise: the private-ID and public-ID received in the REGISTER which is being processing, as well as information related to the S-CSCF that sends said "CX-Put", and a "server assignment type" field stating "registration".

The HSS then finds out the corresponding SD register and stores in the location data of said register a new entry stating that said "S-CSCF1" (shown in FIG. 6 as "S-CSCF1.HOME1.NET") is serving session control for said user (USER-N), and said identifiers: "User-N_PUBLIC2" and "User-N_PRIVATE1" (shown in FIG. 6 as location data entry comprising "S-CSCF1.HOME1.NET {User-N_PUBLIC2, User-N_PRIVATE1}). As an implementation option, the HSS can make said S-CSCF to serve sessions addressed to said user to any of the public-IDs associated to said user, as will be further explained. Next, the registration of said user (USER-N) from said terminal (UE1) is granted ("200 OK", not shown).

Steps 7, 8 and 9 are equivalent to equivalent steps 1 to 3 detailed above. In this case, the registration request (REGISTER) is sent from a subsequent terminal (UE2) through a given, P-CSCF (P-CSCF2) which, in the example shown in the figure, appears to be different from the one the previous registration request was made (P-CSCF1). Said difference can be due to several factors that does not affect the scope of the present invention (e.g.: UE1 and UE2 are accessing the same home 3G system from different visited 3G systems; or UE1 and UE2 are in different location areas within the same system, assigned each to a different P-CSCF. However, since a P-CSCF adds information related to itself when it forwards a registration request to an I-CSCF (as previously explained with reference to step 2 of FIG. 2), and this information will be received and kept by the S-CSCF selected for said registration (together with the public and private IDs indicated in said registration); in case of multiple registrations for the same user, it is not relevant if the P-CSCF serving access in a subsequent registration is the same or a different P-CSCF as the one(s) used for previous active registration(s), given that said P-CSCF shall be uniquely identified in the corresponding S-CSCF (the S-CSCF selected for said subsequent registration) as serving an active registration for a certain private-ID and a certain public-ID.

Following with the aforementioned specific case used as example, we can assume now that the REGISTER contains "User-N_PRIVATE2" as private-ID and "User-N_PUBLIC1" as public-ID. When the registration query (CX-Query) of step 9 is received in the HSS, then the SD register of USER-N is identified by using existing techniques based on the received identities, as mentioned above.

Once said SD register has been found, the HSS checks if the received private-ID ("User-N_PRIVATE2") is already contained within the location data of said SD. Should this be the case, then, as mentioned previously with reference to step 3 of FIG. 2 (re-registration case), the HSS would answer back in step 10 with a registration status query response (CX-Query Resp) comprising information related to the S-CSCF in charge of serving session control services for said user, together with a registration status indication that states that said user is already registered. However, assuming the specific case shown within this example, said private-ID ("User-N_PRIVATE2") is not yet contained within the location data of said SD; therefore, in step 10 a registration query response (CX-Query Resp) is sent to the I-CSCF comprising: a registration status indication, stating that USER-N is not registered with said received private-ID, and (optionally) the capabilities required for selecting from said I-CSCF an S-CSCF that will finally support for said registration session control for further sessions involving said user for said received private-ID (User-N_PRIVATE2) and public-ID (User-N_PUBLIC1).

In the particular case shown with reference to FIG. 5, since the location data of said SD register of said USER-N is not empty at this stage, the HSS can also provide to the I-CSCF a list comprising information related to one or more of the S-CSCF(s) that are referenced in said location data. This can be useful, for instance, whenever a policy for assigning always the same S-CSCF to the same user for all his/her registrations is deployed. In the particular case cited as example, said list would comprise information related only "S-CSCF1".

The I-CSCF then, since the registration status indication states that the registering user is not registered with said received private-ID, selects an S-CSCF and in step 11 forwards the received REGISTER to it. For selecting an S-CSCF, the I-CSCF can either: use state-of-the-art techniques for selecting an S-CSCF when no S-CSCF is provided by the HSS (e.g.: based on the capabilities received from the HSS); or, in case information related to one or more S-CSCFs is received from the HSS, choose one of them. As it can be understood, the latest case would be useful for implementing the aforementioned policy of assigning always the same S-CSCF to the same user.

In the example shown within this flow, it has been assumed that the I-CSCF has, for instance, selected an S-CSCF based on the capabilities received from the HSS. I.e.: other policy, different from the one posed above is applied. In the example, said selection has resulted in that "S-CSCF2" has been finally chosen; however, as will be later understood, another S-CSCF could have been selected, that could be the same or different as the one serving said user for the previous registration (S-CSCF1), without affecting at all the scope of the multiple registrations of USER-1 and the handling of further calls addressed to said user for any of said multiple registrations.

The S-CSCF selected for this registration (S-CSCF2) acts similarly as described above for the previous registration. It first stores information related to the P-CSCF that is serving this registration (which in the case used as example is "P-CSCF2" for this registration), as well as the private and public IDs indicated on it (User-N_PRIVATE2, User-N_PUBLIC1) and, in step 12, notifies (CX-Put) to the HSS that said S-CSCF2 will serve sessions involving said private-ID (User-N_PRIVATE2) and said public-ID (User-N_PUBLIC1).

The HSS finds out the corresponding SD register and creates a new location data entry in said SD register, said new entry storing information stating that said "S-CSCF2" (shown as "S-CSCF2.HOME1.NET" in FIG. 6) is serving session control for said user (USER-N), and said identifiers: "User-N_PUBLIC1" and "User-N_PRIVATE2" (shown in FIG. 6 as location data entry comprising "S-CSCF2.HOME1.NET {User-N_PUBLIC1, User-N_PRIVATE2}"). As shown in FIG. 6, and as opposed to the aforementioned prior-art techniques, it can be observed that, each registration made for each of the private-IDs of the same user causes a new location data entry to be created, said entry storing information about the S-CSCF assigned to serve session control for further sessions related to said registration, as well as information about the identities (public-ID, private-ID) indicated in said registration. As an implementation option mentioned before, the HSS can later make any of said S-CSCFs to serve sessions addressed to any of the public-IDs associated to said user, as will be further explained.

Next, the registration of said user (USER-N) from said terminal (UE2) is granted ("200 OK", not shown).

For the third registration flow shown in the example of FIG. 5, the registration request (REGISTER) is sent from a subsequent terminal (UE3) through a given P-CSCF (P-CSCF3) in which, similarly to previous registration (steps 7 to 12), it has been depicted as requested through a P-CSCF different from the ones used in previous registrations. In this case we can assume that the private-ID indicated in said REGISTER is "User-N_PRIVATE3" and the public-id is "User-N_PUBLIC2".

Steps 13, 14 and 15 are similar to equivalent steps of the previous registrations, wherein only the content of the REGISTER varies.

In this case, as well as for all the registrations of any user, and independently if said user is already registered with any private-ID or not, upon reception of a registration query (CX-Query) in step 15, the HSS will first locate the SD register that correspond to the identities received in the register request, and then check in said SD register if the private-ID received in said register request ("User-N_PRIVATE3") is already within any of the entries stored in the location data of said SD. For this subsequent (third) registration, as well as for the previous subsequent registration explained with reference to steps 7 to 12 (second), the location data of said SD register of said USER-N is not empty, containing in this particular case, two entries ("S-CSCF1.HOME1.NET {User-N_PUBLIC2, User-N_PRIVATE1}", and "S-CSCF2.HOME1.NET {User-N_PUBLIC1, User-N_PRIVATE2}"), each entry in said location data referencing an active registration.

The HSS then in step 16 sends a registration query response (CX-Query Resp) to the I-CSCF comprising: a registration status indication, stating that USER-N is not registered with said received private-ID (User-N_PRIVATE3), and (optionally) the capabilities required for selecting from said I-CSCF an S-CSCF that will finally support for said registration session control for further sessions involving said user for said received private-ID (User N_PRI-VATE3) and public-ID (User-N_PUBLIC2).

Since the location data of said SD register of said USER-N is neither empty in this case, in the query response the HSS can also provide to the I-CSCF a list comprising information related to one or more of the S-CSCF(s) that are referenced in said location data. So, in this case said list can comprise information related only to "S-CSCF1", only to "S-CSCF2", or to both of them.

In case a policy is wanted in which all the registrations of a given user that indicate the same public-ID are assigned to the same S-CSCF, then said list shall contain information related to the S-CSCF which is already assigned to serve session control related to a previous registration that indicated said public-ID (if any). In this specific example case, said list would contain information related only to "S-CSCF1", since, at the moment this third registration request is handled, an S-CSCF (S-CSCF1) have been already assigned for a previous registration that contained the same public-ID (User-N_PUBLIC2) as the present one.

In the example shown in FIG. 5, in step 17 the I-CSCF forwards the registration request to S-CSCF1. This behaviour shows a policy for selecting an S-CSCF when both: S-CSCF capabilities, and information related to S-CSCF(s) is present in the "CX-Query Resp", different from the one described for the previous (second) registration with reference to equivalent step 11 (i.e.: no S-CSCF is selected based on received S-CSCF capabilities if S-CSCF(s) is (are) indicated from the HSS); being in this case the result of said policy that all registrations of a given user indicate the same public-ID are assigned to the same S-CSCF.

The S-CSCF selected for this registration (S-CSCF1), first stores information related to the P-CSCF that is serving this registration (which in the case used as example is "P-CSCF3" for this registration), as well as the private and public IDs indicated on it (User-N_PRIVATE3, User-N_PUBLIC2) and, in step 18, notifies (CX-Put) to the HSS that said S-CSCF1 will serve sessions involving said private-ID (User-N_PRIVATE3) and said public-ID (User-N_PUBLIC2).

Then, once the HSS finds out the corresponding SD register, it creates a new location data entry in said SD register, said new entry storing information stating that said "S-CSCF1" (shown as "S-CSCF1.HOME1.NET" in FIG. 6) is serving session control for said user (USER-N), and said identifiers: "User-N_PUBLIC2" and "User-N_PRIVATE3" (shown in FIG. 6 as location data entry comprising "S-CSCF1.HOME1.NET {User-N_PUBLIC2, User-N_PRIVATE3}"). As an implementation option mentioned above, the HSS can make any of said S-CSCFs to serve sessions addressed to any of the public-IDs associated to said user, as will be further explained.

Next, the registration of said user (USER-N) from said terminal (UE2) is granted ("200 OK", not shown).

Figure 7:
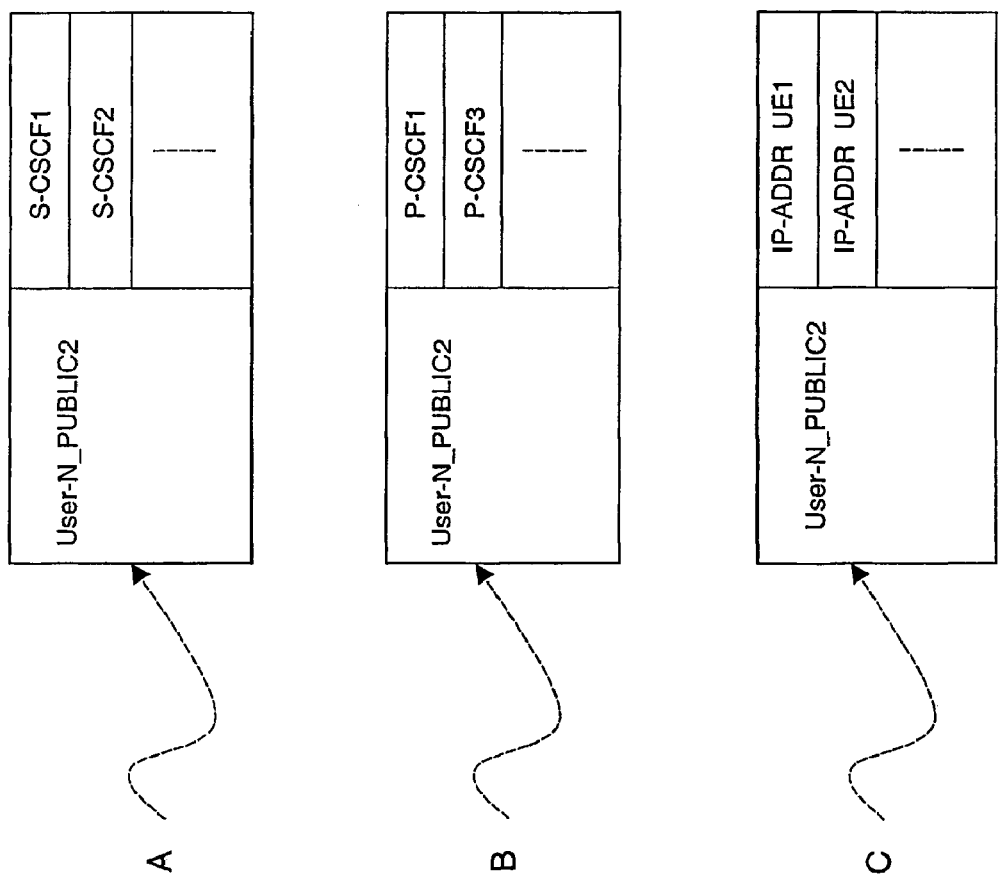
FIG. 7 shows data storage in various servers according to an optional feature of this invention.

As an optional further feature that can, for instance, facilitate look-up searches at further sessions requested towards any of the public-IDs of a given user that has got multiple registrations (multi-registered user), the HSS can build a look-up table that binds each public-ID of said user with a list containing information related to each S-CSCF that was stored in said HSS as assigned to serve session control for further sessions addressed to said user for said public-ID (if any). Said list can, for instance, be built/updated upon subsequent registration notifications (CX-Put) received from S-CSCF(s). An example of an entry in said table in the HSS is shown in FIG. 7 [A], wherein it is displayed the list of S-CSCFs (S-CSCF1, S-CSCF2, ..., etc.) currently serving a given public-ID (User-N_PUBLIC2).

Similarly, and with the same purpose, similar tables can be maintained in S-CSCFs and P-CSCFs for every granted registration. A S-CSCF would then bind a given public-ID with a list containing information of each P-CSCF trough which a registration containing said public-ID was granted from said S-CSCF. Said list can, for instance, be built/updated at the moment a registration is granted ("200 OK" sent). An example of an entry in said table in a given S-CSCF is shown in FIG. 7 [B], wherein it is displayed the list of P-CSCFs (P-CSCF1, P-CSCF2, ..., etc.) currently serving a given public-ID (User-N_PUBLIC2).

On the other hand, a P-CSCF would then bind a given public-ID with a list containing the individual IP-Addr of each terminal (UE) that have got a granted registration through it and have used said public-ID in the granted registration. Said list can, for instance, be built/updated at the moment a registration is granted ("200 OK" received, or "200 OK" sent). An example of an entry in said table in a given P-CSCF is shown in FIG. 7 [C], wherein it is displayed the list of addresses (P-ADDR UE1, IP-ADDR UE2, ..., etc.) of the UE(s) that got a granted registration through it and indicated, for instance, "User-N_PUBLIC2" as public-ID.

Figure 8:
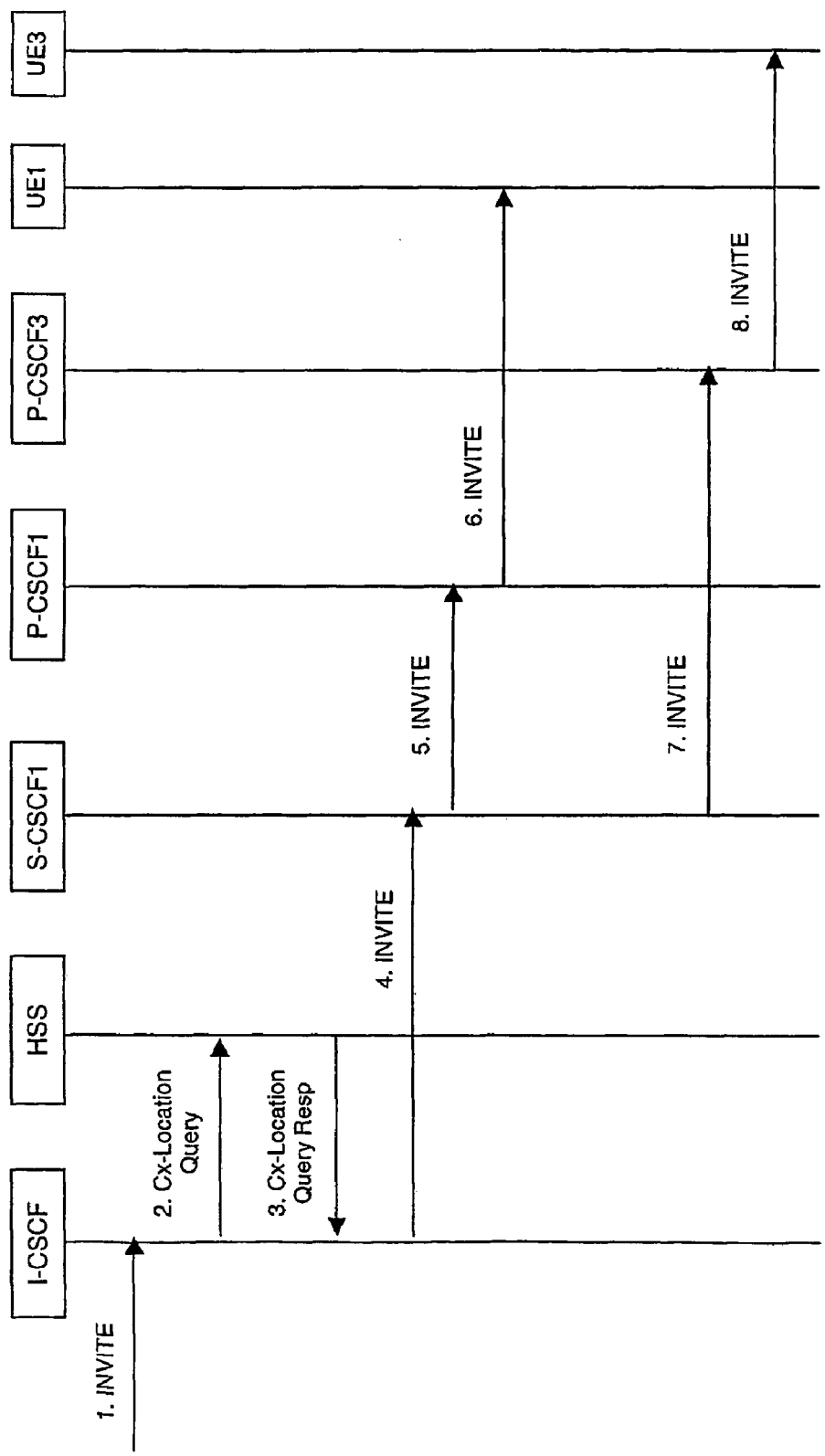
FIG. 8 shows a multiple session establishment flow according to this invention.

Reference is now made to FIG. 8 to illustrate, according to the present invention, the handling of multiple session establishment towards a given user that has got multiple registrations (multi-registered user); as opposed to the state-of-the-art single session establishment towards a user who has a single registration previously described with reference to FIG. 2, steps 11 to 16. In particular, FIG. 8, shows a simplified signaling flow of a session establishment process requested towards a given IM-user from a plurality of terminals (UE1, UE2, UE3) in a 3G system as a result of the processing of a session request (INVITE) by the processing means on the entities depicted in said figure (P-CSCFs, I-CSCF, HSS, S-CSCF). For the sake of a better understanding, the aforementioned example case of an already multi-registered user (as described previously for USER-N) shall be used to exemplify a specific case.

As cited previously with reference to the prior-art depicted in FIG. 2, the location of the session originator (i.e.: the calling party), as well as signaling flows or details previous to the arrival of the session request (INVITE) to an I-CSCF, does not affect the scope of the present invention.

Steps 1 and 2 in FIG. 8, are similar to equivalent steps 11 and 12 in FIG. 2; so, in step 2 of FIG. 8, the I-CSCF sends a location query (CX-Location Query) to the HSS, said query comprising the public-ID received in the INVITE (e.g.: User-N_PUBLIC2). The HSS, by using state-of-the-art techniques, first finds out the corresponding SD register (SD register of USER-N), i.e.: the SD register that contains on its identification data the public-ID received in the query; and then, looks into the location data of said register to determine which S-CSCF (or plurality of S-CSCFs) is (are) already assigned to serve session control for said user and for said received public-ID. Assuming, as an example, that the public-ID received is "User-N_PUBLIC2" (belonging to USER-N), then, assuming also said USER-N has got multiple registrations as described previously with reference to FIG. 5, it should be found that S-CSCF2 (S-CSCF2.HOME1.NET) is presently in charge of serving session controls that involve said user for two registrations that were made indicating said public-ID (entries: "S-CSCF1.HOME1.NET {User-N_PUBLIC2, User-N_

PRIVATE1})", and "S-CSCF1.HOME1.NET {User-N_PUBLIC2, User-N_PRIVATE3}" shown in the location data of USER-N in FIG. 6).

Alternatively, for the purpose of finding out quickly in the HSS what S-CSCF(s) are presently assigned to serve session control for a given user and a given public-ID associated to the identification data of said user, the HSS can use the location information stored in the aforementioned look-up table (FIG. 7 [A]) that relates public-IDs with the corresponding assigned S-CSCF(s).

Even though in the specific case used as example only one S-CSCF (S-CSCF1) is found for said user (USER-N) and said received public-ID (User-N_PUBLIC2); there could be the case wherein more than one S-CSCF is found as serving the same public-ID for said user (for instance, S-CSCF1 and S-CSCF2). In this case, and according to an embodiment of this invention, the HSS would send back in step 3 a location query response (CX-Location Query Resp) to the I-CSCF comprising information related to only one S-CSCF among the plurality of S-CSCFs in charge of serving session control for said user and said public-ID. Therefore, according with this embodiment, and in the specific case used as example, the HSS would send back in step 3 a location query response (CX-Location Query Resp) to the I-CSCF comprising information related (only) to S-CSCF1.

However, and according to an alternative embodiment of this invention, the HSS can send back in step 3 a location query response (CX-Location Query Resp) to the I-CSCF comprising a list with information related to more than one S-CSCF among the plurality of S-CSCFs serving session control for said user and said public-ID, or even comprising information related to all of said S-CSCFs. Conditions for the execution or not of this alternative embodiment can be settled on a per user basis (e.g.: based on the user profile data handled by the HSS) or as a general implementation for all the users; being in any case useful whenever, for instance, it is wanted (either: by the user or by the network operator) a high degree of availability for answering terminating sessions.

According to further another alternative embodiment the location query response (CX-Location Query Resp) sent from the HSS to the I-CSCF in step 3, can comprise information related to one, or more than one, S-CSCF(s) which is (are) in charge of serving session control for any of the public-IDs assigned to said user. In this case, since (as mentioned earlier for the registration procedure) for every active registration: in a given S-CSCF, there is a binding between a given public-ID indicated in a successful registration and the P-CSCF involved in said registration; and, in a given P-CSCF, there is a binding between a given public-ID indicated in a successful registration and the address of the UE involved in said registration; whenever the HSS sends information related to an S-CSCF which is serving said user, but for a public-ID different from the one received in the location query, the HSS will accompany the information related to said S-CSCF with the public-ID said S-CSCF is serving for said user. For instance, in the specific case cited above, and considering the location data shown in FIG. 6 for the multi-registered USER-N, should the HSS send a location query response (CX-Location Query Resp) comprising information related to S-CSCF2, it should include the public-ID "User-N_PUBLIC1" accompanying to the information related to said S-CSCF2.

Procedures in the I-CSCF at reception of the location query response (CX-Location Query Resp) depends on the information related to S-CSCF(s) received in said response.

When the location query response (CX-Location Query Resp) contains information related to only one S-CSCF, the I-CSCF forwards the received session request (INVITE) to the S-CSCF indicated by the HSS in said query response. If, however, said response contains information related to a plurality of S-CSCFs, the I-CSCF can implement different options that (as mentioned above) can be deployed, for instance, according to the aforementioned high or low degree of availability wanted for answering terminating sessions.

According to an embodiment of this invention, the I-CSCF selects one S-CSCF among said plurality of S-CSCFs indicated by the HSS, and forwards the received INVITE to it.

According to further another alternative embodiment, the I-CSCF forwards the INVITE simultaneously to more than one of said plurality of S-CSCFs. In this case, as soon as the session is awarded (i.e: answered or accepted) (e.g.: reception of SIP response code "200 OK" from one of said S-CSCFs), the I-CSCF can tear down the session requests it had sent to the other S-CSCFs (e.g.: sending a SIP cancel request "CANCEL" to said S-CSCFs).

According to further another alternative embodiment, the I-CSCF forwards the INVITE sequentially to more than one of said plurality of S-CSCFs until the INVITE is awarded by one of them; for instance: until a positive response code (such as "200 OK"), is received. For this purpose, the I-CSCF can, for instance, set a timer of a pre-defined value when it sends the INVITE to a first S-CSCF; so, once a given period of time has elapsed without receiving said positive response (time-out), or a negative response have been received (e.g.: a SIP response code "4XX"), it shall forward the INVITE to a second S-CSCF, etc.; thus proceeding correspondingly with the subsequent S-CSCFs. Optionally, the I-CSCF can tear down the session request it forwarded to a given S-CSCF at time-out (e.g.: sending a SIP cancel request "CANCEL" to said S-CSCF).

In any of the aforementioned cases (INVITE forwarded to one S-CSCF, or forwarded simultaneously or sequentially to more than one S-CSCF), whenever the I-CSCF forwards the session request (INVITE) to a S-CSCF that was indicated by the HSS with a public-ID different from the public-ID received in said INVITE (i.e.: said S-CSCF is serving the same user but for a different public-ID); then, the INVITE said I-CSCF forwards to said S-CSCF shall contain the public-ID received from the HSS in replacement of the public-ID originally received in the INVITE.

Referring now to the specific case depicted in FIG. 8, since the location query response (CX-Location Query Resp) have been previously assumed to contain information related only to S-CSCF1 (being, according to the example, no another public-ID accompanying said information), the I-CSCF forwards in step 4 the received INVITE to said S-CSCF1.

When the session request (INVITE) arrives to the S-CSCF, it finds out in the stored information it has related to P-CSCFs, the P-CSCF (or plurality of P-CSCFs) through which a registration was requested (REGISTER) and granted (200 OK) that contained the public-ID received in said INVITE. Assuming, as an example, that the public-ID received in the INVITE is "User-N_PUBLIC2", then the S-CSCF1 would find two P-CSCFs matching the condition above: P-CSCF1 and P-CSCF3.

Alternatively, for the purpose of finding out in the S-CSCF what P-CSCF(s) is (are) presently serving access for a given user and a given public-ID, the S-CSCF can use the information stored in the aforementioned look-up table (FIG. 7 [B]) that relates public-IDs with the corresponding P-CSCF(s).

According to an embodiment of the present invention, the S-CSCF shall forward the INVITE to only one P-CSCF among the plurality of P-CSCFs through which a registration request containing said public-ID was granted from said S-CSCF. So, in the specific case cited as example, the S-CSCF1 would select one P-CSCF among P-CSCF1 and P-CSCF2 and forward the INVITE to the selected P-CSCF.

According to a further alternative embodiments, in case information related to a plurality of P-CSCFs is found through which a registration request containing said public-ID was granted from said S-CSCF, the session request (INVITE) is forwarded from said S-CSCF either: simultaneously or sequentially to more than one P-CSCF among the plurality of P-CSCFs. This is the case depicted in steps 5 and 7 of FIG. 8, in which the INVITE is forwarded (simultaneously or sequentially) to P-CSCF1 and P-CSCF3, since (as assumed by the registration example cited previously) a registration request was requested (steps 5 and 17 in FIG. 5) from said P-CSCFs indicating the same public-ID as the one received in the INVITE (User-N_PUBLIC2).

When, according to an alternative embodiment, the INVITE is forwarded from the S-CSCF simultaneously to more than one of said plurality of P-CSCFs, as soon as the session is awarded (e.g.: reception of SIP response code "200 OK" from one of said P-CSCFs), the S-CSCF can tear down the session requests it had sent to the other P-CSCFs (e.g.: sending a SIP cancel request "CANCEL" to said P-CSCFs).

For the sequential sending of the INVITE from the S-CSCF to more than one of said plurality of P-CSCFs, according to another alternative embodiment, a similar method as the one described before for the sequential sending from the I-CSCF can apply until a positive response code (such as "200 OK") is received. I.e.: the S-CSCF sends the INVITE to a first P-CSCF among said plurality of P-CSCFs and start a timer associated to said sending. At time-out of said timer, or upon reception of a negative response (e.g.: a SIP response code "4XX"), it shall forward the INVITE to a second P-CSCF, etc.; thus proceeding correspondingly with the subsequent P-CSCFs. Optionally, the S-CSCF can tear down the session request it forwarded to a given P-CSCF at time-out (e.g.: sending a SIP cancel request "CANCEL" to said P-CSCF).

Upon reception of a session request (INVITE) in a P-CSCF (e.g.: at steps 5 or 7 of FIG. 8), said P-CSCF finds out in the address information (e.g.: IP-Addr) it keeps related to the terminals (UEs) it is serving access, the UE (or plurality of UEs) from which a registration was requested (REGISTER) and granted (200 OK) through said P-CSCF that contained the public-ID received in said INVITE. Alternatively, for the purpose of finding out in the P-CSCF what UE(s) said P-CSCF is serving access that got a granted registration indicating said public-ID, the P-CSCF can use the information stored in the aforementioned look-up table (FIG. 7 [C]) that relates public-IDs with the corresponding UE's addresses.

Then, according to an embodiment of the present invention, said P-CSCF forwards the received INVITE to one UE, among the plurality of UEs it is serving access that got a granted registration using the same public-ID as the one received in the INVITE.

Going on with the specific case cited as example, in which "User-N_PUBLIC2" is received as public-ID in the INVITE; then P-CSCF1 would find the address of UE1 (IP-ADDR UE1), while P-CSCF3 would find the address of UE3 (IP-ADDR UE3). Subsequently, in step 6 P-CSCF1 would forward the INVITE to UE1, and P-CSCF would forward the INVITE to UE3 in step 8. However, regardless the specific case cited as example, at reception of an INVITE in a given P-CSCF, a plurality of UEs could be found matching the condition above (e.g.: if UE1 and UE3 got a registration through the same P-CSCF indicating the same public-ID in the REGISTER). In this case, and according to further alternative embodiments of the present invention, said P-CSCF would forward said INVITE, either: simultaneously or sequentially, to more than one UE among said plurality of UEs.

According to an alternative embodiment, the INVITE is forwarded from the P-CSCF simultaneously to more than one of said plurality of UEs. In this case, as soon as the session is awarded (e.g: reception of SIP response code "200 OK" from one of said UEs), the P-CSCF can tear down the session requests it had sent to the other UEs (e.g.: sending a SIP cancel request "CANCEL" to said UEs).

If, according to further another alternative embodiment, the INVITE is forwarded from the P-CSCF sequentially to more than one of said plurality of UEs, a similar method as the one described before for the sequential sending of INVITE from a I-CSCF or from a S-CSCF can also apply in the P-CSCF until positive response code (such as "200 OK") is received. Optionally, the P-CSCF can tear down the session request it forwarded to a given UE at time-out (e.g.: sending a SIP cancel request "CANCEL" to said UE).

A given user who has got multiple active registrations (multi-registered user) can become de-registered in a similar manner as described previously with reference to the state-of-the-art de-registration procedures. However, given that for a multi-registered user according to this invention there will be one independent entry per active registration in the location data of the SD register that corresponds to said user, only the right entry in said location data shall be deleted in a de-registration procedure; remaining active all the other registrations of said user (if any other exist).

For instance, using as a reference location data shown in FIG. 6 for USER-N, as well as the public and private IDs used in the specific multiple registration exemplified in FIG. 5; in case of a user-initiated de-registration requested from UE1, only the first entry depicted in the location data of FIG. 6 would be erased ("S-CSCF1.HOME1.NET {User-N_PUBLIC2, User-N_PRIVATE1}"), since said entry will be the only one matching the public-ID and private-ID indicated in the de-registration request (i.e.: as cited previously, a similar message REGISTER as the one used in the registration, comprising the same private and public IDs, but indicating now an "Expire" header of "zero"); however, the other registrations (S-CSCF2.HOME1.NET {User-N_PUBLIC1, User-N_PRIVATE2}"; and "S-CSCF1.HOME1.NET {User-N_PUBLIC2, User-N_PRIVATE3}") would remain active, thus still allowing said user (USER-N) to receive incoming sessions from other parties. Similarly only the data stored in S-CSCF and P-CSCF related to the registration which is now de-registered shall be deleted. So, for the case of de-registration cited above as an example (i.e.: UE1 request a de-registration), P-CSCF1 will delete the previously stored information that bound the public and private IDs used in the registration (User-N_PUBLIC2, User-N_PRIVATE1) with the address of the UE that requested said registration (IP-ADDR UE1); and S-CSCF1 will delete the previously stored information that bound the public and private IDs used in the registration (User-N_PUBLIC1, User-N_PRIVATE1) with the P-CSCF serving the access to said registration (P-CSCF1); however, S-CSCF would keep the data related to the other registration that, according to the example, it is serving for the same user (User-N_PUBLIC2 and User-N_PRIVATE3, bound with P-CSCF3), thus being still able to serve session control for further incoming sessions requested from other parties that are addressed to the public-ID "User-N_PUBLIC2".

The invention claimed is:

1. A method for handling multiple registrations of a user in a Session Initiation Protocol (SIP) based telecommunications system which manages location information and identification information related to its users, each of said registrations being related to a subscription of said user in said system, the method comprising the steps of:
    storing, related to said subscription, one or more public identities;
    storing, related to said subscription, a plurality of private identities;
    receiving registration requests, each registration request requesting to attach a terminal to said SIP based telecommunications system for said subscription, wherein said each registration request includes one of said plurality of private identities and one public identity indicated from said terminal; and
    processing each received registration request according to the private identity and said public identity received in said request.

2. The method of claim 1, wherein the step of processing a received registration request according to said received private and public identities comprises the steps of:
    receiving a registration query in a home server entity (HSS) which stores data of said subscription, said registration query containing, at least, said received said received private and public identities,
    verifying in said home server (HSS) if said user is already registered with said private identity,
    answering said registration query with information for further handling said registration request; said information comprising at least one information element selected from:
        a registration status indication stating if said user is not registered with said received private identity,
        the capabilities required for a session-control server entity in order to support session control for further sessions involving said user for said public identity and said private identity,
        information related to a session-control server that is already assigned to serve session control to said user for said received public identity and any of the private identities associated to the subscription of said user, or
        a list containing information related to one or more of the plurality of session-control servers that are already assigned to serve session control to said user for any of the public and private identities associated to the subscription of said user.

3. The method of claim 2, further comprising the steps of:
    selecting, according to said information for handling said registration request, a session-control server entity for serving session control for further sessions involving said user for said public identity and said private identity, and granting the registration of said user from said terminal in said system.

4. The method of claim 3, wherein the step of granting comprises the step of granting said registration to said terminal from said selected session-control server through a first-contact-point server entity serving the access of said terminal to said system.

5. The method of claim 4, wherein the step of granting said registration from said selected session-control server further comprises the step of binding said received public identity with a list containing information of each first-contact-point server through which a registration containing said public identity has been granted from said session-control server.

6. The method of claim 4, wherein the step of granting said registration through said first-contact-point server entity further comprises the step of binding said received public identity with a list containing the individual address of each terminal that have got a granted registration through it and have used said public identity in the granted registration.

7. The method of claim 3, further comprising the steps of:
    sending from said selected session-control server to said home server (HSS) information related to said selected session-control server, said received public identity and said received private identity;
    storing in said home server (HSS) information stating that said selected session-control server is assigned to serve session control for further sessions related to said user for said received public identity and said received private identity; said information being stored in addition to any eventual previously stored information concerning to any other session-control server already assigned to serve session control for further sessions related to said user for any public identity and any private identity assigned to the subscription of said user.

8. The method of claim 7, further comprising the step of binding in said home server (HSS) said received public identity with a list containing information related to each session-control server which has notified that is assigned to serve session control for further sessions related to said user for said public identity.

9. The method of claim 1, wherein the handling of a session establishment addressed to said user comprises the steps of:
    receiving a session request containing a public identity related to the subscription of said user in said telecommunications system, and
    processing said session request according to the registration status of the public identities and private identities of said user.

10. The method of claim 9, wherein the step of processing said session request comprises one step among:
    forwarding said session request to one terminal among a plurality of terminals which has a registration granted for said subscription;
    forwarding said session request sequentially to more than one of said plurality of terminals, until said session is awarded by one of them;
    forwarding said session request simultaneously to more than one of said plurality of terminals.

11. The method of claim 9, wherein the step of processing said session request according to the registration status of the public identities and private identities of said user comprises the steps of:
    receiving a location request query containing said received public identity in said home server entity (HSS), answering said location request query with information for further handling said session request; said information further comprising at least one information element selected from:
- a list containing information related to one or more session-control server entities that are assigned to serve session control to said user for said received public identity, or
- a list containing information related to one or more session-control server entities that are assigned to serve session control to said user for any of his public identities;

wherein, the information of a session-control server is further accompanied of a public identity to replace, as received public identity, the originally received public identity whenever said session-control server is serving session control to said user for a public identity different of the originally received public identity.

12. The method of claim 11, further comprising one step among:
- forwarding the session request to one session-control server received in said information for further handling said session request,
- forwarding the session request sequentially to more than one session-control server received in said information for further handling said session request, until the session is awarded by one of them,
- forwarding the session request simultaneously to more than one session-control server received in said information for further handling said session request.

13. The method of claim 12, further comprising one step among:
- forwarding a received session request from a session-control server to one first-contact-point server entity among a plurality of first-contact-point servers through which a registration containing the received public identity has been granted from said session-control server,
- forwarding a received session request from a session-control server sequentially to more than one first-contact-point server among said plurality of first-contact-point servers, until said session is awarded by one of them,
- forwarding a received session request from a session-control server simultaneously to more than one first-contact-point server among said plurality of first-contact-point servers.

14. The method of claim 13, further comprising one step among:
- forwarding a received session request from a first-contact-point server entity to one terminal, among a plurality of terminals said first-contact-point server is serving access that got a granted registration using said public identity,
- forwarding a received session request from a first-contact-paint server entity sequentially to more than one terminal among said plurality of terminals, until said session request is awarded by one of them,
- forwarding a received session request from a first-contact-point server entity simultaneously to more than one terminal among said plurality of terminals.

15. A system for handling multiple registrations of a user in a Session Initiation Protocol (SIP) based telecommunications system which manages location information and identification information related to its users, each of said registrations being related to a subscription of said user in said system, the system comprising:

- storage means arranged to store, related to said subscription, a plurality of private identities wherein said storage means further arranged to store one or more public identities for said subscription, and
- processing means arranged to process received registration requests according to the private identity among said plurality of private identities received on each of said requests, wherein each of said registration request requests to attach a terminal to said system for said subscription wherein said each request includes one of said plurality of private identities and one public identity indicated from said terminal;

wherein said processing means are further arranged to process each of said received registration requests according to said received private identity and said public identity received in said request.

16. The system of claim 15, wherein said processing means comprise:
- means for receiving in a home server entity (HSS) which stores data of said subscription a registration query containing, at least, said received private and public identities,
- means in said home server for verifying if said user is already registered with said private identity,
- means in said home server for answering said registration query with information for further handling said registration request; said information comprising one or any combination thereof among:
  - a registration status indication stating if said user is not registered with said received private identity,
  - the capabilities required for a session-control server entity in order to support session control for further sessions involving said user for said public identity and said private identity,
  - information related to a session-control server that is already assigned to serve session control to said user for said received public identity and any of the private identities associated to the subscription of said user,
  - a list containing information related to one or more of the plurality of session-control servers that are already assigned to serve session control to said user for any of the public and private identities associated to the subscription of said user.

17. The system of claim 16, wherein said processing means further comprise:
- means for selecting, according to said information for handling said registration request, a session-control server entity for serving session control for further sessions involving said user for said public identity and said private identity, and means for granting the registration of said user from said terminal in said system.

18. The system of claim 17, wherein said means for granting comprise means for granting said registration from said selected session-control server to said terminal through a first-contact-point server entity serving the access of said terminal to said system.

19. The system of claim 18, wherein said selected session-control server is arranged to bind a given public identity with a list containing information of each first-contact-point server through which a registration containing said public identity was granted from said session-control server.

20. The system of claim 18, wherein said first-contact-point server entity is arranged to bind a given public identity with a list containing the individual address of each terminal that have got a granted registration through it and have used said public identity in the granted registration.

21. The system of claim 17, wherein said home server (HSS) is further arranged to store information of a session-control server which notifies it has been assigned to serve session control for further sessions related to said user for said received public identity and said received private identity; said information being stored in addition to any eventual previously stored information concerning to any other session-control server already assigned to serve session control for further sessions related to said user for any public identity and any private identity assigned to the subscription of said user.

22. The system of claim 21, wherein said home server (HSS) is further arranged to bind a given public identity with a list containing information related to the session-control servers which notified that are assigned to serve session control for further sessions related to said user for said public identity.

23. The system of claim 15, wherein for the handling of a session establishment addressed to a user, said processing means are further arranged to process a session request containing a public identity related to the subscription of said user according to the registration status of the public identities and private identities of said user.

24. The system of claim 23, wherein said processing means are arranged to:
 forward said session request to one terminal among a plurality of terminals which has a registration granted for said subscription, or
 forward said session request sequentially to more than one of said plurality of terminals, until said session is awarded by one of them, or
 forward said session request simultaneously to more than one of said plurality of terminals.

25. The system of claim 23, wherein said processing means comprise:
 means for receiving a location request query containing said received public identity in said home server entity (HSS),
 means for answering said location request query with information for further handling said session request; said information comprising one or any combination thereof among:
  a list containing information related to one or more session-control server entities that are assigned to serve session control to said user for said received public identity,
  a list containing information related to one or more session-control server entities that are assigned to serve session control to said user for any of his public identities;

wherein, the information of a session-control server is further accompanied of a public identity to replace, as received public identity, the originally received public identity whenever said session-control server is serving session control to said user for a public identity different of the originally received public identity.

26. The system of claim 25, wherein said processing means are further arranged to:
 forward the session request to one session-control server received in said information for further handling said session request, or
 forward the session request sequentially to more than one session-control server received in said information for further handling said session request, until the session is awarded by one of them, or
 forward the session request sequentially to more than one session-control server received in said information for further handling said session request, until the session is awarded by one of them, or
 forward the session request simultaneously to more than one session-control server received in said information for further handling said session request.

27. The system of claim 26, wherein a session-control server receiving a session request is arranged to:
 forward said session request to one first-contact-point server entity among a plurality of first-contact-point servers through which a registration containing the received public identity has been granted from said session-control server, or
 forward said session request sequentially to more than one first-contact-point server among said plurality of first-contact-point servers, until said session is awarded by one of them, or
 forward said session request simultaneously to more than one first-contact-point server among said plurality of first-contact-point servers.

28. The system of claim 27, wherein a contact-point server entity receiving a session request is arranged to:
 forward said session request to one terminal, among a plurality of terminals said first-contact-point server is serving access that got a granted registration using said public identity, or
 forward said session request sequentially to more than one terminal among said plurality of terminals, until said session request is awarded by one of them, or
 forward said session request simultaneously to more than one terminal among said plurality of terminals.

* * * * *

UNITED STATES PATENT AND TRADEMARK OFFICE
CERTIFICATE OF CORRECTION

| | |
|---|---|
| PATENT NO. | : 7,177,642 B2 |
| APPLICATION NO. | : 10/480607 |
| DATED | : February 13, 2007 |
| INVENTOR(S) | : Sanchez Herrero et al. |

It is certified that error appears in the above-identified patent and that said Letters Patent is hereby corrected as shown below:

In Column 13, Line 54, delete "private-ILs" and insert -- private-IDs --, therefor.

In Column 25, Line 34, in Claim 2, after "at least," delete "said received".

In Column 27, Line 56, in Claim 14, delete "paint" and insert -- point --, therefor.

Signed and Sealed this

Twentieth Day of May, 2008

JON W. DUDAS
*Director of the United States Patent and Trademark Office*